(12) United States Patent
Abdoli et al.

(10) Patent No.: US 11,109,378 B2
(45) Date of Patent: Aug. 31, 2021

(54) METHODS AND APPARATUS FOR SIDELINK COMMUNICATIONS CONFIGURATION

(71) Applicant: Huawei Technologies Co., Ltd., Shenzhen (CN)

(72) Inventors: Javad Abdoli, Kanata (CA); Yu Cao, Kanata (CA); Amine Maaref, Ottawa (CA); Zhenfei Tang, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/585,099

(22) Filed: Sep. 27, 2019

(65) Prior Publication Data

US 2020/0146010 A1 May 7, 2020

Related U.S. Application Data

(60) Provisional application No. 62/754,086, filed on Nov. 1, 2018.

(51) Int. Cl.
*H04W 72/04* (2009.01)
*H04W 92/18* (2009.01)

(52) U.S. Cl.
CPC ..... *H04W 72/0453* (2013.01); *H04W 72/042* (2013.01); *H04W 92/18* (2013.01)

(58) Field of Classification Search
CPC ... H04L 5/0007; H04L 5/0044; H04L 5/0053; H04W 36/0016; H04W 72/0406; H04W 72/042; H04W 72/0453; H04W 92/18
See application file for complete search history.

(56) References Cited

U.S. PATENT DOCUMENTS

2019/0150135 A1   5/2019  Lee et al.
2019/0306923 A1*  10/2019 Xiong ................. H04W 72/042
(Continued)

FOREIGN PATENT DOCUMENTS

WO     2017192006 A2    11/2017

OTHER PUBLICATIONS

3GPP TS 38.213 V15.3.0 (Sep. 2018), 3rd Generation Partnership Project; Technical Specification Group Radio Access Network; NR; Physical layer procedures for control, (Release 15), 101 pages.
(Continued)

*Primary Examiner* — Saad A. Waqas
(74) *Attorney, Agent, or Firm* — Slater Matsil, LLP

(57) ABSTRACT

A sidelink (SL) configuration for SL communications directly between a communication terminal and another communication terminal is separate from a communication network link configuration for communications with network equipment in some embodiments. An SL configuration, which could be an SL reconfiguration or an SL pre-configuration for use by the communication terminal after the terminal transitions from in coverage to out of coverage, could be transmitted through network/terminal signaling, and detailed examples of such signaling are disclosed herein. An SL configuration could be or include an SL bandwidth part (BWP) configuration and an SL communication resource configuration, such as one or more resource pools, within the SL BWP. An SL configuration that is determined and transmitted by network equipment to one or more terminals could also or instead involve a common or initial SL configuration to be used for SL communications by multiple communication terminals.

16 Claims, 9 Drawing Sheets

(56) References Cited

U.S. PATENT DOCUMENTS

| | | | |
|---|---|---|---|
| 2019/0357291 A1* | 11/2019 | Zhou | H04W 72/042 |
| 2020/0029318 A1* | 1/2020 | Guo | H04L 1/1819 |
| 2020/0045674 A1* | 2/2020 | Tseng | H04W 72/04 |
| 2020/0053768 A1* | 2/2020 | Chen | H04W 16/10 |
| 2020/0077391 A1* | 3/2020 | Choi | H04W 72/0446 |

OTHER PUBLICATIONS

3GPP TS 38.331 V15.3.0 (Sep. 2018), 3rd Generation Partnership Project; Technical Specification Group Radio Access Network; NR; Radio Resource Control (RRC) protocol specification, (Release 15), 445 pages.

Huawei, Hisilicon, 3GPP TSG RAN WG1 Meeting #94 R1-1808092, Gothenburg, Sweden, Aug. 20-24, 2018 Overview of general PHY sidelink design, 5 pages.

Panasonic, 3GPP TSG RAN WG1 Meeting #94 R1-1808647, Gothenburg, Sweden, Aug. 20-24, 2018 Discussion on physical layer structures and procedure(s) of NR sidelink, 4 pages.

Interdigital Inc., 3GPP TSG RAN WG1 Meeting #94 R1-1809094, Gothenburg, Sweden, Aug. 20-24, 2018, NR Sidelink Physical Layer Structures and Procedures, 6 pages.

NTT Docomo, Inc., 3GPP TSG RAN WG1 Meeting #94 R1-1809157, Gothenburg, Sweden, Aug. 20-24, 2018, Physical layer structures and procedure(s), 5 pages.

Huawei, Hisilicon, 3GPP TSG RAN WG1 Meeting #94bis R1-1810138, Chengdu, China, Oct. 8-12, 2018 Sidelink PHY structure and procedure for NR V2X, 15 pages.

Fraunhofer HHI, Fraunhofer IIS, 3GPP TSG RAN WG1 Meeting #94bis R1-1810484, Chengdu, China, Oct. 8-12, 2018, Design for NR V2X Physical Channels, 8 pages.

ZTE, 3GPP TSG RAN WG1 Meeting #94bis R1-1810722, Chengdu, China, Oct. 8-12, 2018, Discussion on NR Sidelink Physical layer structure, 7 pages.

Asustek, 3GPP TSG-RAN WG1 Meeting #94bis R1-1811164, Chengdu, China, Oct. 8-12, 2018 Discussion on resource pool and bandwidth part, 3 pages.

Interdigital Inc., 3GPP TSG RAN WG1 Meeting #94bis R1-1811213, Chengdu, China, Oct. 8-12, 2018 NR Sidelink Physical Layer Structures and Procedures, 8 pages.

Nokia, Nokia Shanghai Bell, 3GPP TSG RAN WG1 Meeting #94bis R1-1811427, Chengdu, China, Oct. 8-12, 2018, Discussions on NR V2X Sidelink Physical Layer Structures and Procedures, 15 pages.

Ericsson, 3GPP TSG-RAN WG1 Meeting #94bis Tdoc R1-1811592, Chengdu, China, Oct. 8-12, 2018 Physical layer structures of NR V2X, 16 pages.

3GPP TSG-RAN WG2 Meeting #100,R2-1713385:"UE behavior for using provisioned ITS carrier", Qualcomm Incorporated, Reno, USA, Nov. 27-Dec. 1, 2017, total 3 pages.

3GPP TSG-RAN WG1 Meeting #97,R1-1907134: "PHY layer structure for NR sidelink", Ericsson, Reno, Nevada, U.S., May 13-17, 2019, total 22 pages.

* cited by examiner

METHODS AND APPARATUS FOR SIDELINK COMMUNICATIONS CONFIGURATION

CROSS-REFERENCE TO RELATED APPLICATION

The present application claims the benefit of U.S. Provisional Application Ser. No. 62/754,086, entitled "METHODS AND APPARATUS FOR SIDELINK COMMUNICATIONS CONFIGURATION", and filed on Nov. 1, 2018, the entire contents of which are incorporated herein by reference.

FIELD

The application relates generally to wireless sidelink (SL) communications, and in particular embodiments, to configuration of sidelink communications.

BACKGROUND

One possible application of SL communications is vehicle to everything/anything (V2X) communication, for example, which is an increasingly important new category of communication that may become widespread in next generation wireless communication networks, such as 5G New Radio (NR) systems. V2X refers to a category of communication scenarios, including communication from a vehicle to another vehicle (V2V), vehicle to infrastructure (V2I), and vehicle to pedestrian (V2P), for example. In general, a vehicle communicating in a network is considered user equipment (UE) or a terminal.

Communication in V2X systems may be performed using links between the network and the terminal, such as an uplink (UL) and a downlink (DL). The UL is a wireless communication link from a terminal to a base station (BS), and the DL is a wireless communication link from a BS to a terminal. In V2X communications using the UL and DL, data is transmitted from a transmitting terminal to a BS, and then transmitted from the BS to a receiving terminal.

Alternatively, V2X communications may be performed between a transmitting terminal and a receiving terminal using a sidelink. The SL allows data to be transmitted directly from the transmitting terminal to the receiving terminal, without forwarding the data via the BS.

Communication resources are required for UL, DL and SL communications. For example, a terminal could wirelessly transmit data to or receive data from another terminal using a particular frequency and during a particular time slot. The combination of frequency and time slot defines a communication resource in this example.

An SL is an example of an air interface, which is the wireless communications link between two or more communicating devices, such as a radio access network device (e.g., a base station, a NodeB, an evolved NodeB, a transmit point) and an electronic device (e.g., a terminal such as a UE, a mobile phone, a sensor, a camera). Typically, both communicating devices need to know specific parameters of the air interface in order to successfully transmit and receive a transmission.

Configuring the communicating devices with the same air interface parameters allows the communicating devices to reliably identify, organize and use physical resources, such as time, frequency, or time and frequency resources.

Challenges in V2X communications, and more generally SL communications, include efficient configuration of terminals, to configure resources that are to be used for SL communications, for example.

SUMMARY

According to an aspect of the present disclosure, a method involves: obtaining, by a communication terminal, a sidelink (SL) configuration; communicating directly, by the communication terminal, with a second communication terminal according to the SL configuration; wherein the SL configuration is separate from a communication network link configuration to be used by the communication terminal for communications with a network equipment in a communication network.

In some embodiments, the SL configuration comprises an SL bandwidth part (BWP).

In some embodiments, the SL BWP comprises a BWP configured within a shared carrier spectrum in which communication resources for the communications with the network equipment in the communication network are configured.

In some embodiments, the SL BWP is disjoint from the communication resources for the communications with the network equipment in the communication network.

In some embodiments, the SL BWP at least partially overlaps the communication resources for the communications with the network equipment in the communication network.

In some embodiments, the SL configuration is based on SL configuration information that is received by the communication terminal to configure or reconfigure the SL configuration.

In some embodiments, obtaining the SL configuration comprises obtaining, by the communication terminal, an SL preconfiguration as the SL configuration.

In some embodiments, the obtained SL preconfiguration comprises any one of the following: an SL configuration preconfigured in the communication terminal prior to deployment of the communication terminal; an SL configuration preconfigured in the communication terminal other than by higher-layer signaling; an SL configuration preconfigured in the communication terminal by a network entity in the communication network prior to the communication terminal becoming out of coverage; an SL configuration forwarded to the communication terminal directly by another communication terminal; a common or initial SL configuration preconfigured in the communication terminal.

In some embodiments, the SL configuration further comprises an SL communication resource configuration within the SL BWP.

In some embodiments, the SL communication resource configuration comprises one or more resource pools.

In some embodiments, the SL configuration comprises a common SL configuration to be used for SL communications by a plurality of communication terminals, including the communication terminal.

Another aspect of the present disclosure relates to a communication terminal comprising: a processor; and a non-transitory computer readable storage medium storing programming for execution by the processor, the programming including instructions to: obtain an SL configuration; communicate directly with a second communication terminal according to the SL configuration; wherein the SL configuration is separate from a communication network link configuration to be used by the communication terminal for communications with network equipment in a communication network.

In some embodiments, the SL configuration comprises an SL BWP.

In some embodiments, the SL BWP comprises a BWP configured within a shared carrier spectrum in which communication resources for the communications with the network equipment in the communication network are configured.

In some embodiments, the SL BWP is disjoint from the communication resources for the communications with the network equipment in the communication network.

In some embodiments, the SL BWP at least partially overlaps the communication resources for the communications with the network equipment in the communication network.

In some embodiments, the SL configuration is based on SL configuration information that is received to configure or reconfigure the SL configuration.

In some embodiments, the programming includes instructions to obtain the SL configuration by obtaining an SL preconfiguration as the SL configuration.

In some embodiments, the obtained SL preconfiguration comprises any one of the following: an SL configuration preconfigured in the communication terminal prior to deployment of the communication terminal; an SL configuration preconfigured in the communication terminal other than by higher-layer signaling; an SL configuration preconfigured in the communication terminal by a network entity in the communication network prior to the communication terminal becoming out of coverage; an SL configuration forwarded to the communication terminal directly by another communication terminal; and a common or initial SL configuration preconfigured in the communication terminal.

In some embodiments, the SL configuration further comprises an SL communication resource configuration within the SL BWP.

In some embodiments, the SL communication resource configuration comprises one or more resource pools.

In some embodiments, the SL configuration comprises a common SL configuration to be used for SL communications by a plurality of communication terminals, including the communication terminal.

Another aspect of the present disclosure relates to an apparatus comprising: a processor; and a non-transitory computer readable storage medium storing programming for execution by the processor, the programming including instructions to perform a method as disclosed herein, such as a method that involves obtaining, by a communication terminal, an SL configuration; communicating directly, by the communication terminal, with a second communication terminal according to the SL configuration; wherein the SL configuration is separate from a communication network link configuration to be used by the communication terminal for communications with a network equipment in a communication network.

Another aspect of the present disclosure relates a computer program product comprising a non-transitory computer readable storage medium storing programming, the programming including instructions to perform a method as disclosed herein, such as a method that involves obtaining, by a communication terminal, an SL configuration; communicating directly, by the communication terminal, with a second communication terminal according to the SL configuration; wherein the SL configuration is separate from a communication network link configuration to be used by the communication terminal for communications with a network equipment in a communication network.

Other aspects and features of embodiments of the present disclosure will become apparent to those ordinarily skilled in the art upon review of the following description.

BRIEF DESCRIPTION OF THE DRAWINGS

For a more complete understanding of the present disclosure, and the advantages thereof, reference is now made to the following description taken in conjunction with the accompanying drawings, in which.

DETAILED DESCRIPTION

For illustrative purposes, specific example embodiments will be explained in greater detail below in conjunction with the figures. It should be appreciated, however, that the present disclosure provides many applicable concepts that can be embodied in any of a wide variety of specific contexts. The specific embodiments discussed are merely illustrative and do not limit the scope of the present disclosure.

Figure 1:
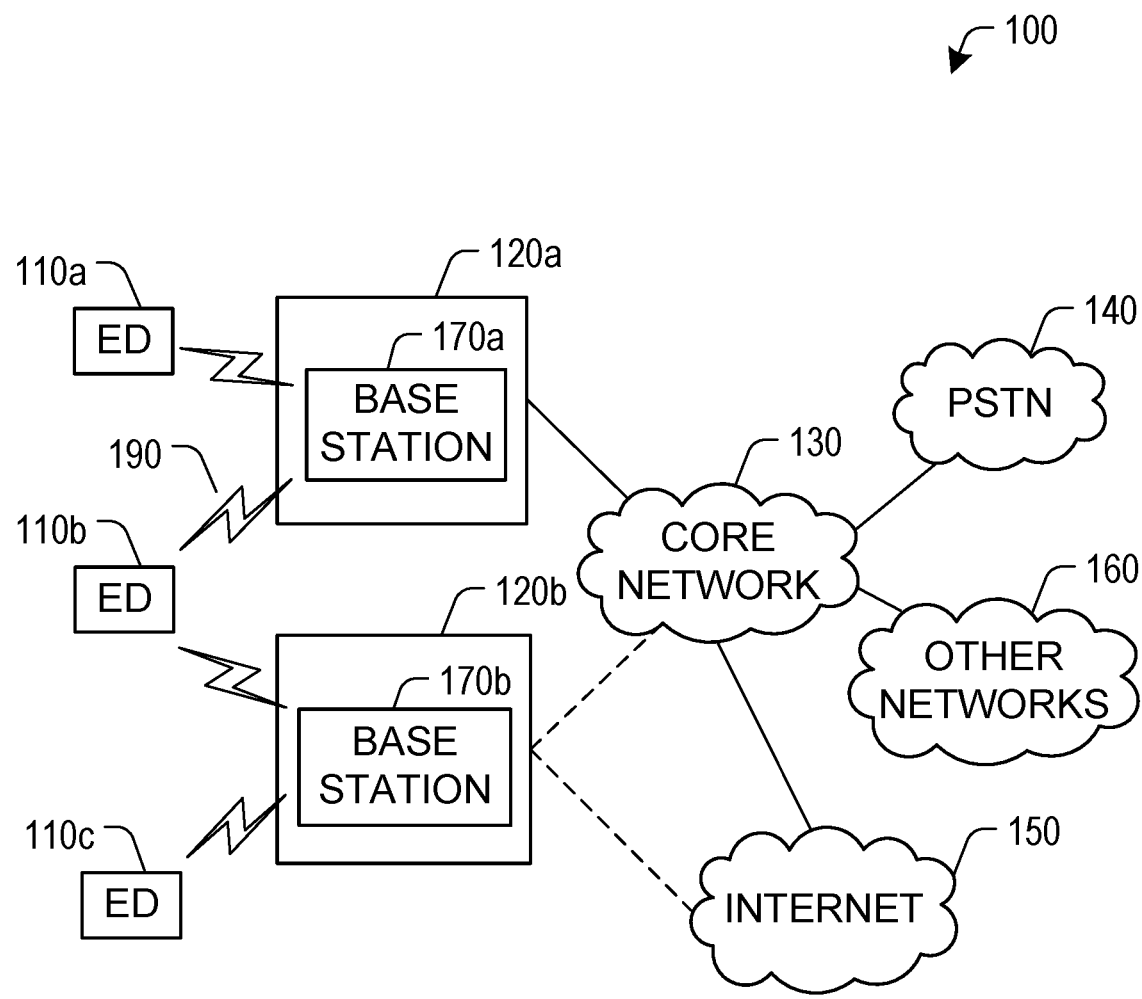
FIG. 1 is a network diagram of a communication system.

FIG. 1 illustrates an example communication system 100 in which embodiments of the present disclosure could be implemented. In general, the communication system 100 enables multiple wireless or wired elements to communicate data and other content. The purpose of the communication system 100 may be to provide content (voice, data, video, text) via broadcast, narrowcast, user device to user device, etc. The communication system 100 may operate by sharing resources such as bandwidth.

In this example, the communication system 100 includes electronic devices (ED) 110a-110c, radio access networks (RANs) 120a-120b, a core network 130, a public switched telephone network (PSTN) 140, the internet 150, and other networks 160. Although certain numbers of these components or elements are shown in FIG. 1, any reasonable number of these components or elements may be included in the communication system 100.

The EDs 110a-110c are configured to operate, communicate, or both, in the communication system 100. For example, the EDs 110a-110c are configured to transmit, receive, or both via wireless or wired communication channels. Each ED 110a-110c represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, or consumer electronics device. A terminal as disclosed herein is intended to include such EDs. Although not explicitly shown in FIG. 1, any or all of EDs 110a-110c could communicate directly with each other through SL communications, and need not only communicate through a network. As disclosed in further detail herein, a terminal such as an ED could be out of coverage and still communicate directly with one or more other EDs.

In FIG. 1, the RANs 120a-120b include base stations 170a-170b, respectively. Each base station 170a-170b is configured to wirelessly interface with one or more of the EDs 110a-110c to enable access to any other base station 170a-170b, the core network 130, the PSTN 140, the internet 150, and/or the other networks 160. For example, the base stations 170a-170b may include (or be) one or more of several well-known devices, such as a base transceiver station (BTS), a Node-B (NodeB), an evolved NodeB (eNodeB), a Home eNodeB, a gNodeB (gNB), a transmission point (TP), a site controller, an access point (AP), or a wireless router. Any ED 110a-110c may be alternatively or additionally configured to interface, access, or communicate with any other base station 170a-170b, the internet 150, the core network 130, the PSTN 140, the other networks 160, or any combination of the preceding. The communication system 100 may include RANs, such as RAN 120b, wherein the corresponding base station 170b accesses the core network 130 via the internet 150, as shown.

The EDs 110a-110c and base stations 170a-170b are examples of communication equipment that can be configured to implement some or all of the functionality and/or embodiments described herein. In the embodiment shown in FIG. 1, the base station 170a forms part of the RAN 120a, which may include other base stations, base station controller(s) (BSC), radio network controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 120b, which may include other base stations, elements, and/or devices. Each base station 170a-170b transmits and/or receives wireless signals within a particular geographic region or area, sometimes referred to as a "cell" or "coverage area". A cell may be further divided into cell sectors, and a base station 170a-170b may, for example, employ multiple transceivers to provide service to multiple sectors. In some embodiments there may be established pico or femto cells where the radio access technology supports such. In some embodiments, multiple transceivers could be used for each cell, for example using multiple-input multiple-output (MIMO) technology. The number of RAN 120a-120b shown is exemplary only. Any number of RAN may be contemplated when devising the communication system 100.

The base stations 170a-170b communicate with one or more of the EDs 110a-110c over one or more air interfaces 190 using wireless communication links e.g. radio frequency (RF), microwave, infrared (IR), etc. . . . The air interfaces 190 may utilize any suitable radio access technology. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190.

A base station 170a-170b may implement Universal Mobile Telecommunication System (UMTS) Terrestrial Radio Access (UTRA) to establish an air interface 190 using wideband CDMA (WCDMA). In doing so, the base station 170a-170b may implement protocols such as HSPA, HSPA+ optionally including HSDPA, HSUPA or both. Alternatively, a base station 170a-170b may establish an air interface 190 with Evolved UTMS Terrestrial Radio Access (E-UTRA) using LTE, LTE-A, and/or LTE-B. It is contemplated that the communication system 100 may use multiple channel access functionality, including such schemes as described above. Other radio technologies for implementing air interfaces include IEEE 802.11, 802.15, 802.16, CDMA2000, CDMA2000 1x, CDMA2000 EV-DO, IS-2000, IS-95, IS-856, GSM, EDGE, and GERAN. Of course, other multiple access schemes and wireless protocols may be utilized.

It should be appreciated that the air interfaces 190 represent an example of one type of air interface, between terminals such as the EDs 110a-110c and network equipment such as the base stations 170a-170b. Sidelinks as disclosed herein are another type of air interface, between multiple terminals.

The RANs 120a-120b are in communication with the core network 130 to provide the EDs 110a-110c with various services such as voice, data, and other services. The RANs 120a-120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a-120b or EDs 110a-110c or both, and (ii) other networks (such as the PSTN 140, the internet 150, and the other networks 160). In addition, some or all of the EDs 110a-110c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as IP, TCP, UDP. EDs 110a-110c may be multimode devices capable of operation according to multiple radio access technologies, and incorporate multiple transceivers necessary to support such protocols.

In embodiments of the present disclosure, the communications system 100 is a heterogeneous communications system with different transmission source types and/or different transmission destination types. The different transmission source types may have different transmission capabilities. The different transmission destination types may have different reception capabilities.

In the heterogeneous communications system, the EDs 110a-110c of FIG. 1 include different types of devices having different capabilities and requirements. More specifically, each ED 110a-110c may be associated with a different traffic type having particular requirements for QoS, latency, throughput, simultaneous connections, etc. Example EDs 110a-110c associated with different traffic types may include a smartphone, a computer, a television, a security camera, a sensor, a thermostat, a heart rate monitor, etc. In a particular example, ED 110a is a computer, ED 110b is a sensor, and ED 110c is a heart rate monitor. Each of the EDs 110a-110c may have different wireless communication capabilities and requirements.

Furthermore, in a heterogeneous communications system, the base stations 170a-170b may communicate with one or more of the EDs 110a-110c over one or more software-configurable air interfaces 190 using wireless communication links. The different radio access network devices (e.g., base stations 170a-170b) and electronic devices (e.g., ED 110a-110c) may have different transmission capabilities and/or requirements. As an example, an eNB may have multiple transmit antennas. A picocell may only have one transmit antenna or a relatively small number of transmit antennas. Additionally, a picocell may transmit at a lower maximum power level as compared to an eNB. Similarly, a computer may have much higher data bandwidth requirement and signal processing capability than a sensor. For another example, a heart rate monitor may have much stricter latency and reliability requirements than a television.

Therefore, in a heterogeneous communications system, such as heterogeneous communications system 100, different pairs of communicating devices (i.e., a network device and an electronic device; or a network device and another network device; or an electronic device and another electronic device) may have different transmission capabilities and/or transmission requirements. The different transmission capabilities and/or transmission requirements can be met by the availability to select different air interface configurations for different devices, communications, or requirements.

Figure 2:
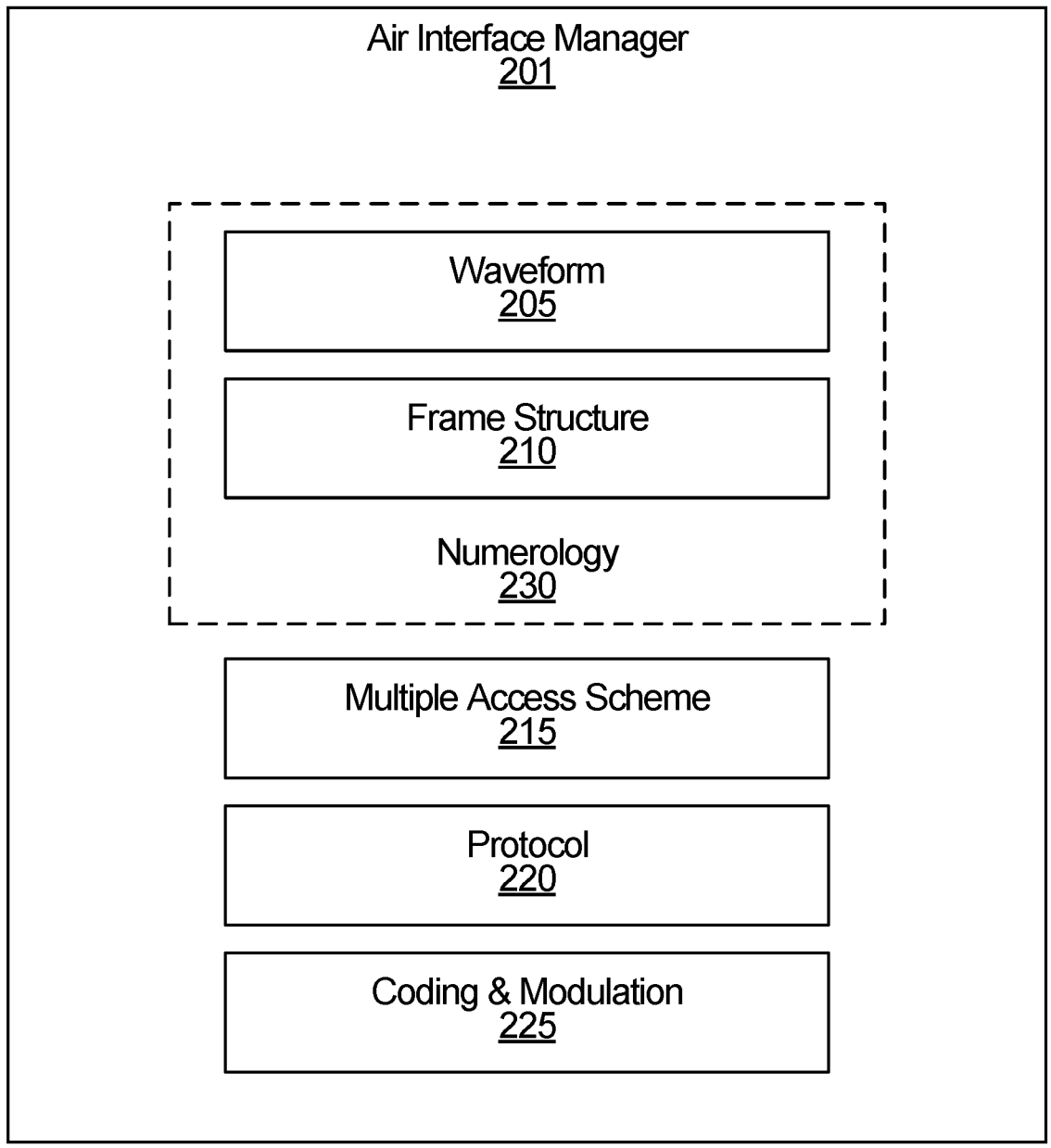
FIG. 2 is a block diagram of an air interface manager for configuring a software-configurable air interface.

FIG. 2 is a block diagram of an air interface manager 201 for configuring a software-configurable air interface, such as air interface 190 (FIG. 1) and/or a terminal/terminal air interface or sidelink. Air interface manager 200 may be, for example, a module comprising a number of components or building blocks that define the parameters of an air interface and collectively specify how a transmission is to be made and/or received by the air interface.

The components of the air interface manger 201 include at least one of a waveform component 205, a frame structure component 210, a multiple access scheme component 215, a protocol component 220, and a coding and modulation component 225.

The waveform component 205 may specify a shape and form of a signal being transmitted. Waveform options may include orthogonal multiple access waveforms and non-orthogonal multiple access waveforms. Non-limiting examples of such waveform options include Orthogonal Frequency Division Multiplexing (OFDM), Filtered OFDM (f-OFDM), Time windowing OFDM, Filter Bank Multicarrier (FBMC), Universal Filtered Multicarrier (UFMC), Generalized Frequency Division Multiplexing (GFDM), Wavelet Packet Modulation (WPM), Faster Than Nyquist (FTN) Waveform, and low Peak to Average Power Ratio Waveform (low PAPR WF).

The frame structure component 210 may specify a configuration of a frame or group of frames. The frame structure component 210 may indicate one or more of a time, frequency, pilot signature, code, or other parameter of the frame or group of frames.

Non-limiting examples of frame structure options include: the number of symbols in the time slot, the number of time slots in the frame and the duration of each time slot (sometimes known as a transmission time interval, TTI, or a transmission time unit, TTU). The frame structure component may also specify whether the time slot is a configurable multi-level TTI, a fixed TTI, or a configurable single-level TTI. The frame structure component may further specify a co-existence mechanism for different frame structure configurations.

For some waveforms, such as certain OFDM-based waveforms, the frame structure component may also specify one or more associated waveform parameters, such as sub-carrier spacing width, symbol duration, cyclic prefix (CP) length, channel bandwidth, guard bands/subcarriers, and sampling size and frequency.

Additionally, the frame structure component 210 may further specify whether the frame structure is used in a time-division duplex communication or a frequency-division duplex communication.

Together, the specifications of the waveform component and the frame structure component are sometimes known as the "numerology." Thus, the air interface 190 (FIG. 1), for example, may include a numerology component 230 defining a number of air interface configuration parameters, such as the sub-carrier spacing, CP length, symbol length, slot length, and symbols per slot. Other types of air interfaces could be specified or characterized by the same, similar, or different parameters.

These numerologies may be scalable in the sense that subcarrier spacings of different numerologies are multiples of each other, and time slot lengths of different numerologies are also multiples of each other. Such a scalable design across multiple numerologies provides implementation benefits, for example scalable total OFDM symbol duration in a time division duplex (TDD) context.

Frames can be configured using one or a combination of scalable numerologies. For example, a numerology with 60 kHz subcarrier spacing has a relatively short OFDM symbol duration (because OFDM symbol duration varies inversely with subcarrier spacing), which makes the 60 kHz numerology particularly suitable for ultra-low latency communications, such as V2X communications. A further example of a numerology with a relatively short OFDM symbol duration suitable for low latency communications is a numerology with 30 kHz subcarrier spacing. A numerology with 15 kHz subcarrier spacing maybe compatible with LTE or serve as a default numerology for initial access of a device to a network. This 15 kHz numerology may also be suitable for broadband services. A numerology with 7.5 kHz spacing, which has a relatively long OFDM symbol duration, may be particularly useful for coverage enhancement and broadcasting. Additional uses for these numerologies will be or become apparent to persons of ordinary skill in the art. Of the four numerologies listed, those with 30 kHz and 60 kHz subcarrier spacings are more robust to Doppler spreading (fast moving conditions), because of the wider subcarrier spacing. It is further contemplated that different numerologies may use different values for other physical layer parameters, such as the same subcarrier spacing and different cyclic prefix lengths.

It is further contemplated that other subcarrier spacings may be used, such as higher or lower subcarrier spacings. For example, other subcarrier spacings varying by a factor of 2n include 120 kHz and 3.75 kHz.

In other examples, a more limited scalability may be implemented, in which two or more numerologies all have subcarrier spacings that are integer multiples of the smallest subcarrier spacing, without necessarily being related by a factor of 2n. Examples include 15 kHz, 30 kHz, 45 kHz, 60 kHz subcarrier spacings.

In still other examples, non-scalable subcarrier spacings may be used, which are not all integer multiples of the smallest subcarrier spacing, such as 15 kHz, 20 kHz, 30 kHz, 60 kHz.

OFDM-based signals can be employed to transmit a signal in which multiple numerologies coexist simultaneously. More specifically, multiple sub-band OFDM signals can be generated in parallel, each within a different sub-band, and each sub-band having a different subcarrier spacing (and more generally with a different numerology). The multiple sub-band signals are combined into a single signal for transmission, for example for downlink transmissions. Alternatively, the multiple sub-band signals may be transmitted from separate transmitters, for example for uplink transmissions from multiple EDs, which may be user equipment UEs or other types of terminal.

The use of different numerologies can allow an air interface to support coexistence of a diverse set of use cases having a wide range quality of service (QoS) requirements, such as different levels of latency or reliability tolerance, as well as different bandwidth or signaling overhead requirements. In one example, the base station can signal to the ED an index representing a selected numerology, or a single parameter (e.g., subcarrier spacing) of the selected numerology. Based on this signaling, the ED may determine the parameters of the selected numerology from other information, such as a look-up table of candidate numerologies stored in memory.

The multiple access scheme component 215 may specify how access to a channel is granted for one or more EDs. Non-limiting examples of multiple access technique options include technologies defining how EDs share a common physical channel, such as: Time Division Multiple Access (TDMA), Frequency Division Multiple Access (FDMA), Code Division Multiple Access (CDMA), Single Carrier Frequency Division Multiple Access (SC-FDMA), Low Density Signature Multicarrier Code Division Multiple Access (LDS-MC-CDMA), Non-Orthogonal Multiple Access (NOMA), Pattern Division Multiple Access (PDMA), Lattice Partition Multiple Access (LPMA), Resource Spread Multiple Access (RSMA), and Sparse Code Multiple Access (SCMA). Furthermore, the multiple access technique options may include scheduled access vs. non-scheduled access, also known as grant-free access; non-orthogonal multiple access vs. orthogonal multiple access, e.g., via a dedicated channel resource (i.e., no sharing between multiple EDs); contention-based shared channel resource vs. non-contention-based shared channel resource, and cognitive radio-based access.

The protocol component 220 may specify how a transmission and/or a re-transmission are to be made. Non-limiting examples of transmission and/or re-transmission mechanism options include those that specify a scheduled data pipe size, a signaling mechanism for transmission and/or re-transmission, and a re-transmission mechanism.

The coding and modulation component 225 may specify how information being transmitted may be encoded/decoded and modulated/demodulated for transmission/reception purposes. Coding may refer to methods of error detection and forward error correction. Non-limiting examples of coding options include turbo trellis codes, turbo product codes, fountain codes, low-density parity check codes, and polar codes. Modulation may refer, simply, to the constellation (including, for example, the modulation technique and order), or more specifically to various types of advanced modulation methods such as hierarchical modulation and low PAPR modulation.

Because an air interface comprises a plurality of components or building blocks, and each component may have a plurality of candidate technologies (also referred to herein as air interface capability options), to the air interface manager 201 may configure and store a large number of different air interface profiles, where each air interface profile defines a respective set of air interface capability options.

For example, in each air interface profile defining a respective set of air interface capability options, an air interface capability option is selected for each of the component building blocks of the air interface. Each of the different air interface profiles may be targeted to meet a different set of transmission requirements, including transmission content, transmit condition, and receive condition.

According to the transmission requirements of a pair of communicating transmitting-receiving devices, one of the different air interface profiles that best meet the transmission requirements may be selected from the air interface manager 201 and used for communications between the pair of communicating transmitting-receiving devices.

In further embodiments, the air interface manager 201 may modify or update its components, profiles, or capability options. For example, the air interface manager 201 may replace the waveform and frame structure components 205, 210, with a single numerology component 230. Conversely, the air interface manager 201 may separate the coding and modulation component 225 into an individual coding component and an individual modulation component. Furthermore, the air interface manager 201 may add a new soft air interface configuration component to be determined in the future.

The air interface manager 201 may also update certain components to modify the capability options of any given component. For example, the air interface manager 201 may update the modulation and coding component 225 to include higher-order modulation schemes.

By updating the stored components, profiles, and candidate options, the air interface manager 201 can flexibly adapt to better accommodate diverse wireless traffic types and services. Modifying or updating components, profiles, and candidate options may allow the air interface manager 201 to provide suitable air interface profiles for traffic types or services other than those already contemplated for ultra-reliable low latency communications (URLLC), enhanced mobile broadband (eMBB), and massive machine-type communications (mMTC).

Figure 2A:
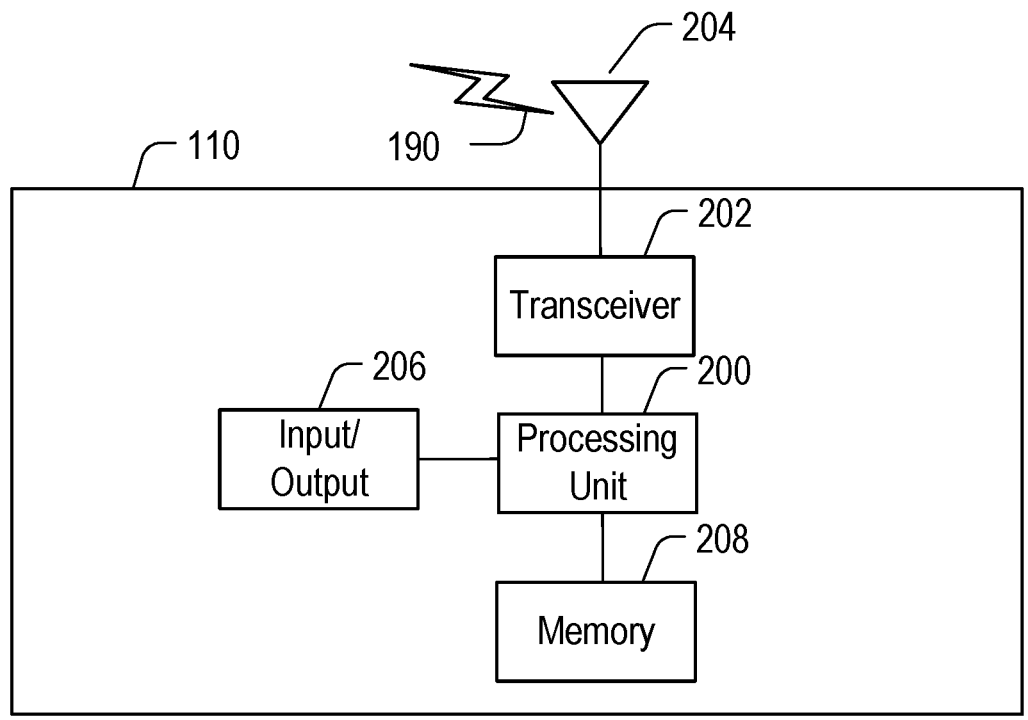
FIG. 2A is a block diagram of an example electronic device.
Figure 2B:
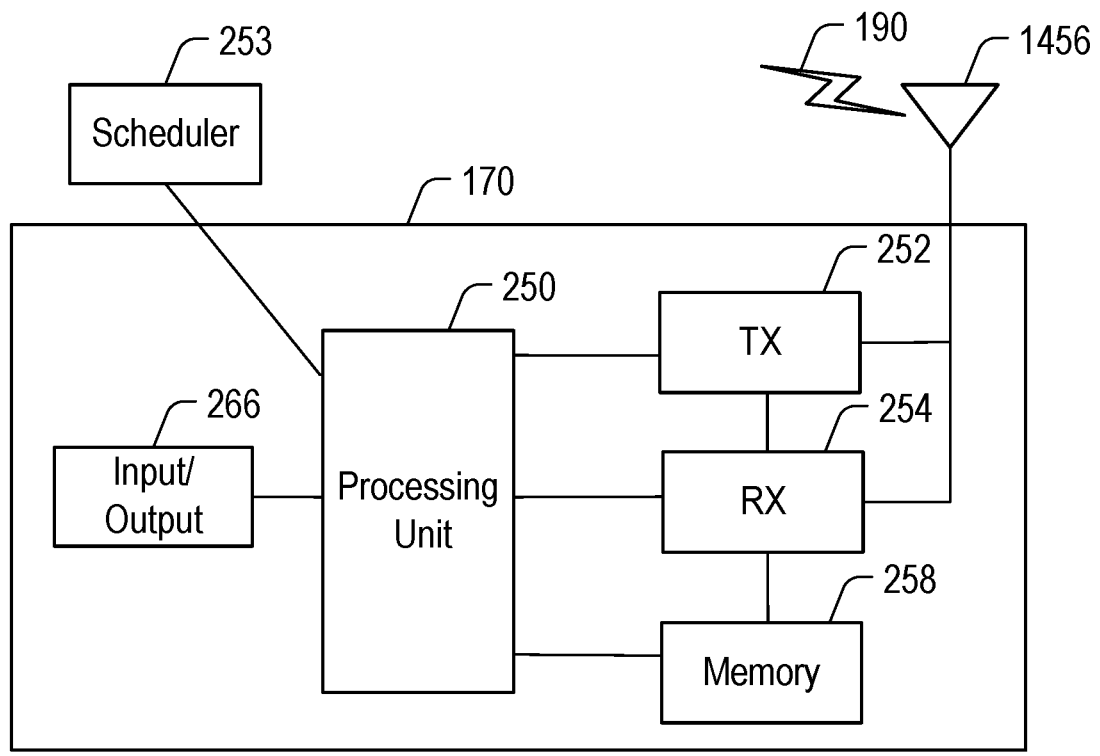
FIG. 2B is a block diagram of an example electronic device.

FIGS. 2A and 2B illustrate example devices that may implement the methods and teachings according to this disclosure. In particular, FIG. 2A illustrates an example ED 110, and FIG. 2B illustrates an example base station 170. These components could be used in the communication system 100 or in any other suitable system.

As shown in FIG. 2A, the ED 110 includes at least one processing unit 200. The processing unit 200 implements various processing operations of the ED 110. For example, the processing unit 200 could perform signal coding, data processing, power control, input/output processing, or any other functionality enabling the ED 110 to operate in the communication system 100. The processing unit 200 could be configured to implement an air interface manager 201 (FIG. 2), for example. The processing unit 200 may also be configured to implement some or all of the functionality and/or embodiments described in more detail herein. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna or Network Interface Controller (NIC) 204. The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the ED 110. One or multiple antennas 204 could be used in the ED 110. Although shown as a single functional unit, a transceiver 202 could also be implemented using at least one transmitter and at least one separate receiver.

FIG. 2A illustrates an ED/base station air interface 190 as an example. A terminal such as an ED 110 could also or instead provide or support other types of air interfaces, including sidelinks as disclosed herein.

The ED 110 further includes one or more input/output devices 206 or interfaces (such as a wired interface to the internet 150). The input/output devices 206 permit interaction with a user or other devices in the network. Each input/output device 206 includes any suitable structure for providing information to or receiving information from a user, such as a speaker, microphone, keypad, keyboard, display, or touch screen, including network interface communications.

In addition, the ED 110 includes at least one memory 208. The memory 208 stores instructions and data used, generated, or collected by the ED 110. For example, the memory 208 could store software instructions or modules configured to implement some or all of the functionality and/or embodiments described herein and that are executed by the processing unit(s) 200. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 2B, the base station 170 includes at least one processing unit 250, at least one transmitter 252, at least one receiver 254, one or more antennas 256, at least one memory 258, and one or more input/output devices or interfaces 266. A transceiver, not shown, may be used instead of the transmitter 252 and receiver 254. A scheduler 253 may be coupled to the processing unit 250. The scheduler 253 may be included within or operated separately from the base station 170. The processing unit 250 implements various processing operations of the base station 170, such as signal coding, data processing, power control, input/output processing, or any other functionality. The processing unit 250 can also be configured to implement some or all of the functionality and/or embodiments described in more detail herein. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission to one or more EDs or other devices. Each receiver 254 includes any suitable structure for processing signals received wirelessly or by wire from one or more EDs or other devices. Although shown as separate components, at least one transmitter 252 and at least one receiver 254 could be combined into a transceiver. Each antenna 256 includes any suitable structure for transmitting and/or receiving wireless or wired signals. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s) such as those described herein in connection to the ED 110. The memory 258 stores instructions and data used, generated, or collected by the base station 170. For example, the memory 258 could store software instructions or modules configured to implement some or all of the functionality and/or embodiments described herein and that are executed by the processing unit(s) 250.

Each input/output device 266 permits interaction with a user or other devices in the network. Each input/output device 266 includes any suitable structure for providing information to or receiving/providing information from a user, including network interface communications.

Additional details regarding the EDs 110 and the base stations 170 are known to those of skill in the art. As such, these details are omitted here for clarity.

FIGS. 1 to 2B and the corresponding descriptions thereof relate to an example communication network and example electronic devices in which or in conjunction with which embodiments of the present disclosure could be implemented.

A conventional long-term evolution (LTE) SL transmission scheme relies on the concept of a resource pool (RP), which defines a pool of time/frequency communication resources and other parameter configurations for SL transmit (Tx) and receive (Rx) functions. The conventional LTE SL transmission scheme includes two transmission modes, known as LTE Mode 3 (scheduled transmission and SL Semi-persistent Scheduling (SPS)) and LTE Mode 4 (UE autonomous selection).

In LTE Mode 3, a BS transmits to a UE control information using a "downlink control information" (DCI), which schedules time-domain and frequency-domain communication resources (from an RP) for SL transmission. This scheduling may be performed dynamically or semi-persistently using a DCI. However, scheduling of the SL transmission resources by the BS results in latency. Before the UE can transmit on the SL, it must wait for the DCI from the BS. Furthermore, the dynamic nature of the resource scheduling increases the signaling overhead associated with an SL transmission.

In LTE Mode 4, the UE autonomously selects resources within the RP, which avoids the latency issue associated with LTE Mode 3. Moreover, in LTE Mode 4 a UE may be able to have SL transmission/reception even if the UE is out of coverage of a cellular network. However, the RP in LTE Mode 4 is not designed to prevent two UEs from selecting the same resource for SL communication. Since there is no direct control, by the network or the BS, of the resources within the RP that are used for SL communications, two UEs can cause a message collision by independently selecting the same resource. When this happens, the collision may cause reliability issues for a message, which may not be successfully decoded by the intended receivers. An SL air interface may also be called a PC5 interface.

In NR Release 15, a bandwidth part (BWP) is a set of contiguous Resource Blocks (RBs) over which a UE can have UL transmission/DL reception. A BWP is defined for a terminal/network (UL/DL) air interface in NR Rel-15. A terminal/network (UL/DL) air interface may also be called a Uu interface. Numerology and some other higher-layer parameters for this air interface are configured per DL/UL BWP, for example Physical Downlink Shared Channel (PDSCH)/Physical Downlink Control Channel (PDCCH)/Physical Uplink Shared Channel (PUSCH)/Physical Uplink Control Channel (PUCCH) configurations. Multiple BWPs can be configured per component carrier (CC), but only one DL BWP and one UL BWP is active at the same time for a UE in NR Rel-15. For UL/DL communications, a UE is not expected to have data transmission/reception outside of its active UL/DL BWP.

Figure 3:
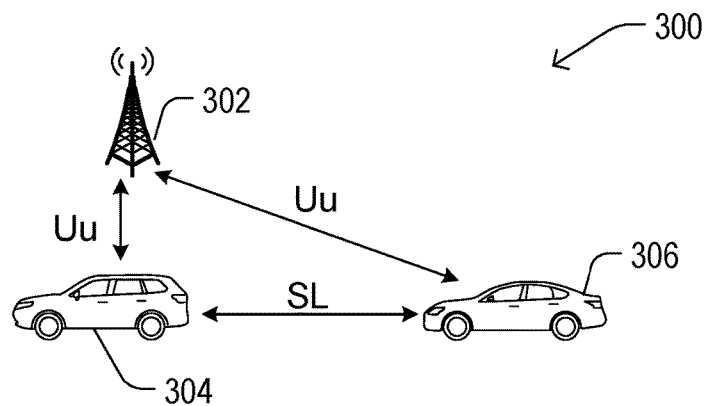
FIG. 3 is a block diagram illustrating air interfaces in an example communication system that supports V2X communications over an SL.

FIG. 3 is a block diagram illustrating air interfaces in an example communication system 300 that supports V2X communications. In the example shown in FIG. 3, network equipment in the form of a base station 302 communicates with terminals at vehicles 304, 306 through a terminal/network (UL/DL) air interface Uu, and the terminals communicate directly with each other through an SL or PC5 air interface. Although only one base station 302 and terminals at two vehicles 304, 306 are shown in FIG. 3, a communication system could include many more base stations and terminals. Terminals might also be referred to as UEs, for example, but are referenced herein primarily as "terminals" in the context of disclosed embodiments.

FIG. 3 represents V2V communications as an illustrative example of V2X communications over an SL. A vehicle terminal need not necessarily communicate only with another vehicle terminal over an SL air interface as shown. A vehicle terminal could also or instead communicate with an infrastructure terminal (in V2I communications), and/or a pedestrian terminal (in V2P communications), for example. A vehicle need not necessarily be an automobile as shown in FIG. 3. Other types of vehicles involved in V2X communications could include, for example, commercial vehicles, motorcycles, bicycles, buses, trains, boats, aircraft, etc. Vehicle terminals could be integrated into vehicles or be separate terminals that are carried by vehicles or their operators. A terminal could communicate with multiple other terminals, and not just one other terminal as shown in FIG. 3.

NR Release 16 (and beyond) aim at supporting V2X communications. This calls for detailed design of an NR sidelink. Aspects of the present disclosure are relate to challenges concerning sidelink resource configuration and channel design, and are motivated by several design criteria and considerations.

For example, it could be desirable to provide a unified design between terminal/network and terminal/terminal air interfaces, shown as Uu air interfaces and an SL air interface in FIG. 3. These air interfaces could involve a shared carrier design, in which a carrier is shared by both SL and Uu, and/or a dedicated carrier design, in which a carrier is dedicated to the SL.

BWP is an NR concept and resource pool is an LTE concept. Another design criterion that could be considered in sidelink resource configuration is a question of how to relate BWP and resource pool concepts to each other.

Unlike UL and DL transmissions, which only support in-coverage terminals that are within a coverage area of and configured for UL/DL communications with a network element such as a base station, it may be desirable for a V2X SL to support both in-coverage terminals and out-of-coverage terminals. An out-of-coverage terminal could be physically located outside the coverage area of any network element, or could be within a coverage area but not configured for or otherwise not engaged in UL/DL communications with a network element. A terminal could be physically located within a coverage area of a network but not connected to the network, for example, and in that sense could still be considered out of coverage. An out-of-coverage terminal would not receive terminal-specific configurations directly from a network element, such as a gNB.

Bandwidth (BW) could be another design criterion. NR supports much wider bandwidths than LTE, and therefore an SL could be designed provide support for terminals with different BW capabilities.

Some embodiments of the present disclosure involve configuring or reconfiguring SL BWPs, by a gNB or other network element for example, or preconfiguring SL BWPs, which could but need not necessarily involve a gNB or other network element. An example signaling structure for configuration or preconfiguration of an SL BWP is also proposed.

Embodiments could also involve configuring, reconfiguring, or preconfiguring Physical Sidelink Control Channel (PSCCH)/Physical Sidelink Shared Channel (PSSCH)/Physical Sidelink Discovery Channel (PSDCH) parameters such as resources, resource pool(s), and/or synch channel per SL BWP.

Common/initial SL BWP configurations are provided in some embodiments. For example, only a common SL resource pool could be configured or preconfigured in a common SL BWP, or all SL resource pools could be configured or preconfigured in a common BWP. Another option involves multiple common BWPs being configured or preconfigured. Different V2X services or communication types such as broadcast, groupcast, and unicast services or different terminal groups, for example, could be configured with different common BWPs. Different terminal groups could be associated with different services under V2X, such as broadcast, groupcast, and unicast services for example, and in this example terminal groups could be established for broadcast terminals, groupcast terminals, and unicast terminals.

These and other aspects of the present disclosure are described in further detail herein.

With reference again to FIG. 3, in accordance with an aspect of the present disclosure, communications over the Uu link or air interface are within a Uu BWP and communications in SL or PC5 interface are within an SL BWP. Shared carrier and dedicated carrier embodiments are contemplated.

Figure 4A:
FIGS. 4A to 4C illustrate shared carrier SL bandwidth part (BWP) configuration examples.
Figure 4B:
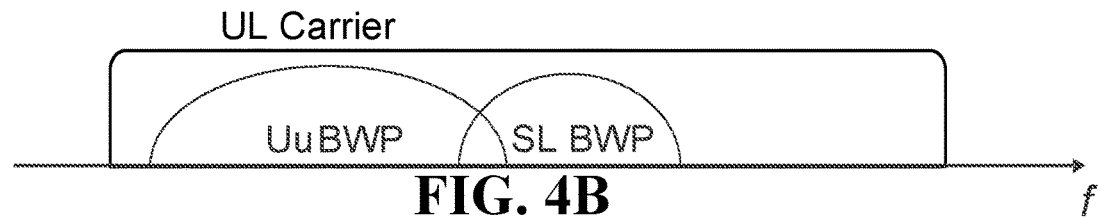
Figure 4C:

FIGS. 4A to 4C illustrate shared carrier SL BWP configuration examples. In these examples, a shared carrier is a UL carrier spectrum. An SL BWP could be totally disjoint in frequency from the Uu BWP as in FIG. 4A, have partial overlap in frequency with the Uu BWP as in FIG. 4B, or be contained within the Uu BWP as in FIG. 4C.

Other embodiments are also possible. For example, although the shared carrier examples in FIGS. 4A to 4C are for a shared UL carrier spectrum, it is possible that a shared spectrum could include a DL carrier spectrum. UL spectrum sharing could be advantageous in that terminals would transmit UL transmissions and SL transmissions in the UL spectrum, for which terminals would already be configured to meet interference requirements and/or other transmission constraints. Terminals could, however, potentially share other spectra or resources between SL communications and other types of communications.

The examples in FIGS. 4A to 4C also illustrate wider bandwidth for the Uu BWP than for the SL BWP. In other embodiments, an SL BWP could have the same bandwidth as, or a wider bandwidth than, a Uu BWP. A Uu BWP could even be contained within an SL BWP.

Other parameters such as numerology are not illustrated in FIGS. 4A to 4C, and could be independent between the Uu BWP and the SL BWP. For NR Uu, for example, FR1 provides numerologies with 15 kHz, 30 kHz, and 60 kHz subcarrier spacing, and one or more of these, and/or others, could be configured for the SL BWP.

Figure 4D:
FIG. 4D illustrates a dedicated carrier SL BWP configuration example.

FIG. 4D illustrates a dedicated carrier SL BWP configuration example, in which one SL BWP is shown within an SL carrier spectrum. In a dedicated SL carrier embodiment, there is no Uu BWP within the SL carrier spectrum. The SL BWP can be configured flexibly across the entire frequency range of the SL carrier. Although only one SL BWP is shown in FIG. 4D, more than one SL BWP, such as terminal-specific SL BWPs for example, could be configured within an SL carrier spectrum. Multiple SL BWPs configured for a terminal could potentially overlap. Also, different terminals perform SL transmission/reception through overlapping active SL BWPs.

A BWP-based transmission/reception structure in SL, shown by way of illustrative example in FIGS. 4A to 4D, could be useful in providing a unified design for SL and Uu, which is also BWP-based.

A BWP-based transmission/reception SL structure could also be useful in providing straightforward support for mixed numerologies between Uu and SL, and/or within SL. Different BWPs could independently be associated with different numerologies, with different subcarrier spacings and/or CP lengths for example.

Similarly, a BWP-based SL structure could provide support for terminals with different BW capabilities. Different terminal-specific BWPs could be configured with different bandwidths, for example.

From a terminal implementation point of view, an SL BWP could have a Radio Frequency (RF) filtering impact, in the sense that a UE may "open up" its RF bandwidth to be as wide as the bandwidth of the SL BWP.

Some embodiments relate to preconfiguration of SL parameters. For example, SL BWPs/SL resources could be preconfigured in a terminal by a manufacturer or other entity before a terminal is deployed to a user. Parameters could be programmed into a chip or a memory device, or otherwise preconfigured.

SL BWPs/SL resources be preconfigured, and/or reconfigured by a V2X control entity. This could, but need not necessarily, involve a gNB and/or other network entity that might handle SL configuration through Radio Resource Control (RRC) or other higher-layer signaling. Preconfiguration or reconfiguration of SL BWPs/SL resources could be provided using a download or plugin, for example, rather than just RRC signaling.

RRC and/or other higher-layer signaling represent possible options for SL BWP/SL resource preconfiguration by a gNB or another network entity. This type of configuration could be considered a form of preconfiguration at least in the sense that a terminal could be "preconfigured" with SL BWP(s)/resource(s)/resource pool(s) while it is in coverage of a gNB, and could then use the preconfigured SL BWP(s)/resource(s)/resource pool(s) after transitioning from in coverage to out of coverage. The higher-layer signaling could be specific to a cell (e.g., a System Information Block, SIBx) or coverage area or terminal-specific.

A terminal (terminal A, for ease of reference) could receive preconfiguration information from another terminal (terminal B) through SL transmission. Terminal B could receive the preconfiguration information from a gNB or another network element, through terminal-specific or cell-specific signaling for example, or from another terminal (terminal C) through SL transmission. This type of "terminal relay" or "terminal forwarding" preconfiguration, in which one or more terminals relay or forward preconfiguration information to an out-of-coverage terminal, could be useful to provide for SL BWP/SL resource preconfiguration in the sense that the out-of-coverage terminal is preconfigured for SL communications without having to enter or re-enter into coverage, and can use the SL BWP/SL resource preconfiguration while out of coverage.

Common or initial SL BWP(s)/resource(s)/resource pool(s) could be configured in SIBx, as mentioned above. A terminal could keep the common/initial SL BWP(s)/resource(s)/resource pool(s) when transitioning from in coverage to out of coverage and use the common/initial SL BWP(s)/resource(s)/resource pool(s) as preconfigured SL BWP(s)/resource(s)/resource pool(s) after transitioning from in coverage to out of coverage.

For inter-frequency preconfiguration, between neighboring cells that use the same or different carrier spectra, parameters for a neighboring cell could be preconfigured in a terminal before handover. Such preconfiguration could involve a gNB in a current coverage area using terminal-specific signaling or another terminal using SL transmission, for example.

Preconfiguration of SL parameters as in these embodiments could be useful, for example, in providing support of SL BWP-based SL communications for out-of-coverage terminals and/or terminals that are exiting one coverage area and possibly entering another coverage area or remaining out of coverage.

Various examples of SL BWP-based configuration/reconfiguration/preconfiguration for SL communications are described above. Turning now to signaling, in accordance with an embodiment a signaling structure includes a new Information Element (IE) for SL BWP-based configuration. For ease of reference, this new IE is referenced herein as SL-V2X-Configured-BWP. In an embodiment, the SL-V2X-Configured-BWP includes the following fields and content:
- SL-BWP-ID, which is an SL BWP identifier or index—in the case of up to 4 configured SL BWPs per terminal, this identifier or index could be 0, 1, 2, 3 for example;
- SL-BWP-configCommon, which includes configuration information that applies to a group of terminals, such as:
  - genericParameters which specifies the numerology and frequency location and bandwidth of an SL BWP:
    - subcarrierSpacing, cyclicPrefix, LocationAndBandwith, in an embodiment
  - parameters that are related to a group of terminals (e.g., common/broadcast/group-common/cell-specific), for example:
    - SL feedback channel, which could be used to support Hybrid Automatic Repeat Request (HARQ)-type feedback for SL communications
    - Group-common/common resource pool configuration
    - Rx resource pool configuration—an Rx resource pool could be larger than a Tx resource pool, to enable a terminal to potentially receive SL transmissions from a larger number of transmitting terminals. Rx resource pool configuration is specified as a common parameter in this example to illustrate that multiple terminals could monitor the same Rx resource pool for SL transmissions from other terminals.

SL-BWP-configDedicated
   terminal-specific SL configurations, for example:
      V2X Tx (and Rx) resource pool configurations, such as:
         Different resource pools of a BWP could be used for different communication modes (e.g., NR mode 1—scheduled transmission; and NR mode 2—terminal autonomous selection). A resource pool could be used for both NR mode 1 and NR mode 2, or for only one mode. Mode information could be part of the resource pool configuration.
         Rx resource pool is also specified as a terminal-specific SL configuration parameter in this example to illustrate that Rx resource pool could be configured for a group of terminals (in SL-BWP-configCommon above) or per-terminal (in SL-BWP-configDedicated)
      Other resource pool configurations, for pedestrian-to-everything/anything (P2X) resource pools for example
      V2X Mode 2 parameters for autonomous resource selection, such as:
         V2X-resourceselectionConfig—any of various resource selection conditions, parameters, or criteria could be specified in this field, including selection conditions based on sensing, for example
         ZoneConfig (terminal-specific, or could be cell-specific and be part of SL-BWP-configCommon in some embodiments): indicates zone configurations used for V2X SL communication, SyncPriority: indicates the synchronization priority order or a method that a terminal should prioritize for synchronization, thresSL-TxPrioritization: indicates a threshold used to determine whether SL V2X transmission is prioritized over uplink transmission if they overlap in time
      Grant-free or configured grant Type 1 configuration list, such as:
         One or more of SL-Configuredgrantconfig (SL-GF-config), including configuration parameters for GF resource allocation
         Grant-free transmission is a transmission mode for which a terminal is configured with time-frequency resources that are used for SL data and SL control information transmission. A terminal follows the configured resource to perform SL data and control transmission. The resource could be configured by network equipment such as a BS using RRC signaling or could be preconfigured.

A signaling structure could also or instead include an IE for multi-BWP configuration. As an example, an SL-V2X-Configuration or SL-V2X-Preconfiguration IE could include multiple SL-V2X-ConfigFreqInfo or SL-V2X-PreconfigFreqInfo IEs, with each SL-V2X-ConfigFreqInfo or SL-V2X-PreconfigFreqInfo including the following, in an embodiment:
   SL-V2X-Configured-BWP-list, including multiple SL-V2X-Configured-BWP IEs (example above)
   General information (including carrier information for carrier configuration for SL) (SL-ConfigGeneral), such as:
      SL-absoluteFrequencyPointA, which indicates a reference frequency location, Point A, for frequency configuration of the SL carrier.
      SL-scs-SpecificCarrierList, which includes a list of numerologies and their corresponding carrier configurations supported in SL, for example:
         SL-subcarrierSpacing, which indicates the subcarrier spacing of the given numerology.
         SL-cyclicPrefix, which indicates either a normal or extended CP length is used for the given numerology.
         SL-offsetToCarrier, which indicates the offset in number of RBs from the reference frequency point A to the lowest usable RB of the given numerology.
         SL-carrierBandwidth, which indicates the number of usable RBs of the given numerology.
   Slot configuration (UL, DL or SL)
   offsetDFN
   Sync information (SL-ConfigSync), such as:
      Sync CP length
      Syncoffset, Sync Tx parameters, SyncTxThreshold etc.

Another IE that could be part of a signaling structure is anchorCarrierFreqList, including the following in an embodiment:
   carrier frequencies/configurations that includes inter-carrier resource configuration
   location(s) of SSB(s) for neighbouring carrier(s)/cell(s).
Another IE, cbr-PreconfigList, could include:
   CBR range for congestion control.

These example IEs could be included in RRC signaling and/or other higher-layer signaling between a network entity such as a gNB and one or more terminals, for example, and could be useful in providing a higher-layer signaling structure that supports SL BWP and is consistent with an NR BWP signaling structure. An IE or other signaling need not necessarily include every field in the above examples. For reconfiguration, for example, only fields that are to be updated might be signaled. Signaling for common BWP configuration, reconfiguration, or preconfiguration includes parameters associated with one or more common BWPs and might or might not also include terminal-specific parameters, for one or more terminal-specific BWPs and/or RPs for example. Similarly, signaling for terminal-specific BWP configuration, reconfiguration, or preconfiguration includes parameters associated with one or more terminal-specific BWPs and might or might not also include parameters associated with one or more common BWPs and/or RPs.

As noted above, BWP is an NR concept and resource pool is an LTE concept, and a design criterion that could be considered in sidelink resource configuration is a question is how to relate BWP and resource pool concepts to each other. In an embodiment, SL resources are configured per SL BWP. For example, PSCCH/PSSCH/PSDCH resources, resource pool(s), and/or sync channel could be configured, reconfigured, and/or preconfigured on a per-SL BWP basis. A resource pool could be an Rx resource pool, a Tx resource pool, or a resource pool for both Rx and Tx. One or more dedicated Tx resource pools and/or Rx resource pools could be configured in an SL BWP.

Figure 5:
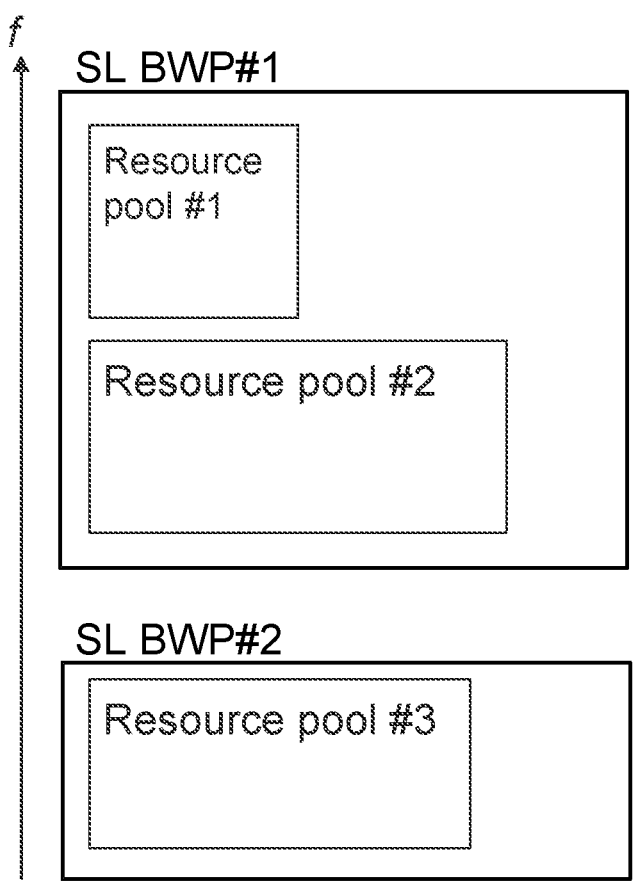
FIG. 5 is a block diagram illustrating an example of resource pool configuration per SL BWP.

FIG. 5 is a block diagram illustrating an example of resource pool configuration per SL BWP. The example shown in FIG. 5 includes two SL BWPs #1 and #2, with two resource pools #1 and #2 configured in SL BWP #1 and one resource pool #3 configured in SL BWP #2. PSCCH/PSSCH/PSDCH and sync channel resources are within the resource pools in this example. Each resource pool is entirely within an SL BWP, so that no resource pool overlaps multiple SL BWPs. In at least some embodiments, only a single BWP is active at any time, and therefore it may be preferable to restrict a resource pool to be within only one SL BWP.

With a configuration as illustrated in FIG. 5, a procedure for determination and usage of resource pool(s) for SL communications by a terminal could involve:
1. Select a preconfiguration (optional), illustratively by index, or start with configuration
2. Select a carrier, through blind detection for example, if starting with selection of a preconfiguration instead of starting with configuration—in the case of starting with configuration, a carrier is configured and need not be blindly detected
3. Select a BWP configuration, based on numerology and/or other parameters, for example
4. Select a Tx mode (NR Mode 1, NR Mode 2, or grant-free), based on which modes have been configured for a terminal and which mode is more suitable for the requirements of an application for the terminal. For example, NR Mode 1 could be selected only if NR Mode 1 is configured for the terminal and the terminal receives a DCI for scheduled transmission. If a terminal is configured with both NR Mode 2 and grant-free mode, then the terminal may choose one of these modes for transmission based on application requirements, etc.
5. Select a Tx resource pool within the selected BWP, based on zone and/or other parameters, for example, if there is more than one Tx resource pool within the selected BWP
6. Listen/monitor for SL transmissions on resources in Rx resource pool(s) within the selected BWP.

Resource pool configuration within SL BWPs could be useful in providing a relationship between BWP and resource pools, consistent with the BWP concept of NR and the resource pool concept of LTE.

Figure 6A:
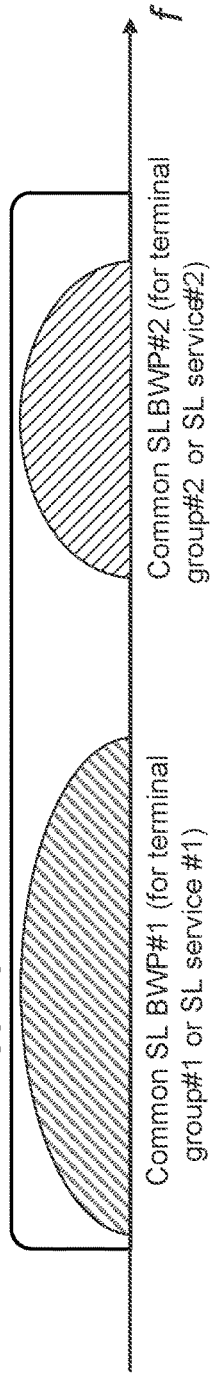
FIGS. 6A to 6C illustrate examples of common and terminal-specific SL BWPs and resource pools.
Figure 6B:
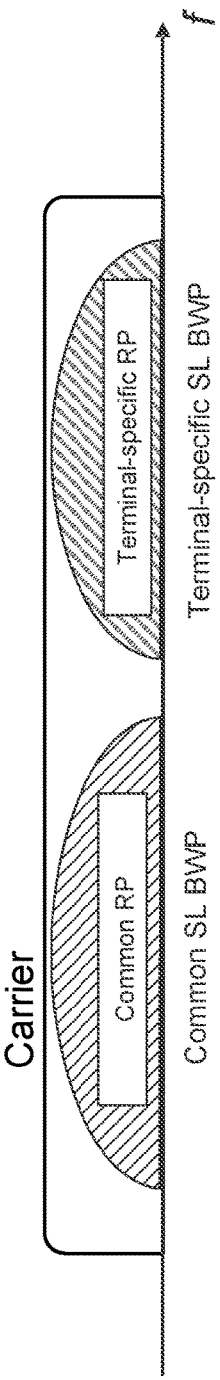
Figure 6C:
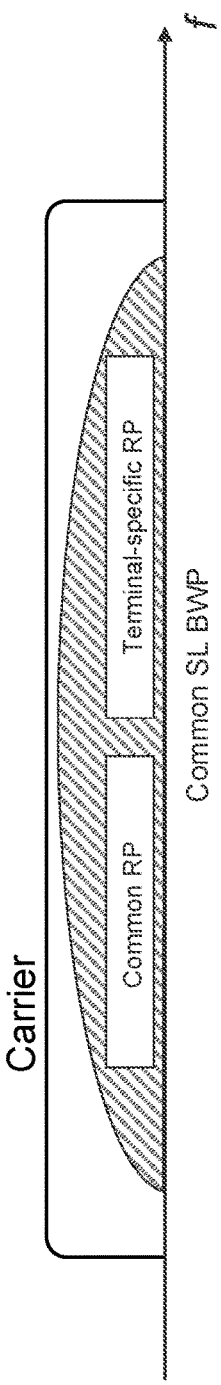

FIGS. 6A to 6C illustrate examples of common and terminal-specific SL BWPs and resource pools.

As shown in FIG. 6A, multiple common SL BWPs could be configured in a carrier spectrum, using SIB-based configuration or preconfiguration for a terminal or group of terminals, for example. More generally, one or multiple common SL BWPs could be configured or preconfigured. Examples of services, referenced as "service #1" and "service #2" in FIG. 6A, include a broadcast service, a groupcast service, and/or a unicast service. Other types of services, and/or other types of terminal groups, could also or instead be supported using common SL BWPs.

In some embodiments, only one or more common SL resource pools, and not terminal-specific resource pools, are configured in a common SL BWP. This is shown in FIG. 6B, in which a common RP is configured in a common SL BWP, and a terminal-specific RP is configured in a terminal-specific SL BWP rather than in the common SL BWP.

According to other embodiments, both common and terminal-specific resource pools could be configured in a common SL BWP. In this case, a terminal might or might not be configured with a terminal-specific BWP, because a terminal-specific resource pool is configured in the common SL BWP. This is shown in FIG. 6C, which illustrates both a common RP and a terminal-specific RP configured in a common SL BWP. One or more common RPs and one or more terminal specific RPs could be configured in a common SL BWP.

Common SL BWP configurations could be useful, for example, to enable group-common SL configurations for multiple terminals. Group-common SL configurations could be in addition to or instead of terminal-specific configurations, such as terminal-specific SL BWP configurations and/or terminal-specific RP configurations.

Figure 7:
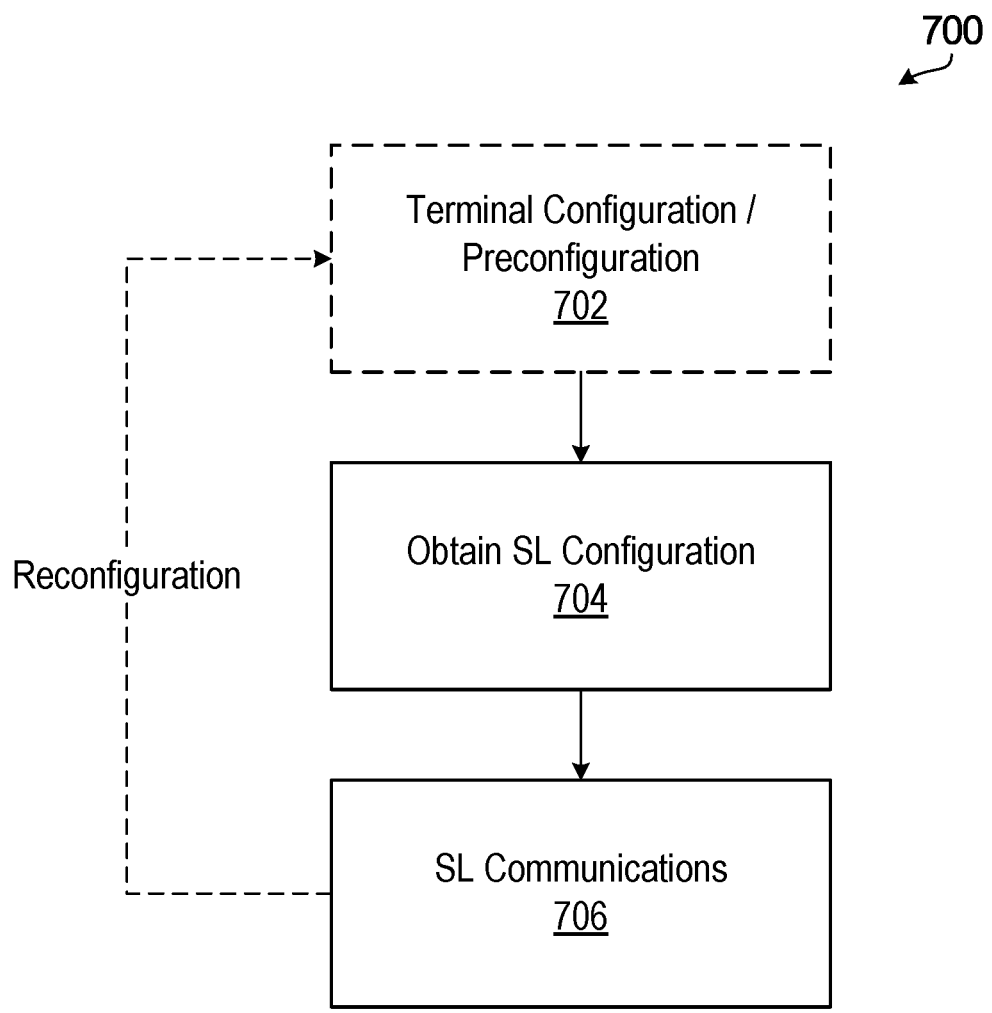
FIG. 7 is a flow diagram illustrating an example method.

Various embodiments are disclosed by way of example herein. The disclosed embodiments encompass, among others, a method as illustrated in FIG. 7.

The example method 700 is illustrative of a method performed by a communication terminal. 702 represents terminal configuration (which could include reconfiguration or initial configuration) or preconfiguration. SL configuration or preconfiguration need not necessarily be performed every time that a terminal is to engage in SL communications with another terminal. For example, a terminal could use the same SL configuration for multiple SL transmissions. SL configuration/preconfiguration at 702 is therefore shown in dashed lines in FIG. 7.

At 704, a terminal obtains an SL configuration that is to be used by the terminal for SL communications directly between that terminal and another terminal. This obtaining at 704 is intended to represent, for example, receiving, determining, and/or selection of an SL configuration if multiple SL configurations are available for use or accessing configuration parameters that have been configured and stored at the terminal, rather than terminal configuration or preconfiguration as illustrated separately at 702. The SL configuration obtained at 704 could be based on SL configuration information that is received at 702 to configure (or reconfigure) the SL configuration, but that SL configuration information could have been previously received by the terminal, before an SL configuration that is to be currently used is obtained at 704. Obtaining the SL configuration at 704 could involve obtaining, by selecting for example, an SL preconfiguration as the SL configuration that is to be used for SL communications.

The SL configuration could be separate from a communication network link configuration that is to be used by the communication terminal for communications with a network equipment in a communication network. A terminal could have a UL/DL configuration for terminal/network communications and a separate SL configuration for SL communications, for example. This is different from other SL communication approaches in which a terminal might just use UL resources for SL communications, without a specific SL configuration. In accordance with at least some embodiments disclosed herein, SL configurations are separate from configurations for network communications.

For completeness, FIG. 7 also illustrates an operation 706 of SL communications, which involves the communication terminal communicating directly with a second communication terminal according to the SL configuration obtained at 704, and could include SL transmission, SL reception, or both.

Various features relating to SL configurations and SL communications are disclosed herein. For example, an SL configuration obtained at 704 could include an SL BWP. An SL BWP could be or include a BWP configured within a shared carrier spectrum, such as an uplink carrier spectrum in which communication resources for network communications with network equipment are configured. The SL BWP could be non-overlapping with, or disjoint from, the network communication resources. The SL BWP could instead at least partially overlap, or even fully overlap, the network communication resources. Overlapping BWPs are illustrated by way of example in FIGS. 4B and 4C and described above.

Dedicated SL carrier spectrum embodiments are also contemplated and disclosed herein. An SL BWP could be or include a BWP that is configured within a dedicated SL carrier spectrum, and an example of this is shown in FIG. 4D and described above.

Regarding an SL preconfiguration, also referred to herein as a preconfigured SL configuration, this could be or include, for example, any of: an SL configuration preconfigured in the communication terminal prior to deployment of the communication terminal; an SL configuration preconfigured in the communication terminal other than by higher-layer signaling; an SL configuration preconfigured in the communication terminal by a network entity in the communication network prior to the communication terminal becoming out of coverage; an SL configuration forwarded to the communication terminal directly by another communication terminal; and a common or initial SL configuration preconfigured in the communication terminal.

An SL configuration could include an SL communication resource configuration within an SL BWP, such as one or more resource pools. Resource pools could be or include one or more of: a transmit resource pool and a receive resource pool.

In some embodiments, an SL configuration includes a common SL configuration to be used for SL communications by multiple terminals. An SL BWP, for example, could be or include a common SL BWP to be used for SL communications by multiple terminals. The SL configuration could further include an SL communication resource configuration of one or more resource pools within the common SL BWP. The one or more resource pools could include, for example, one or more of: a common resource pool to be used for SL communications by the multiple terminals, and a terminal-specific resource pool to be used for SL communications by a particular terminal.

Reconfiguration is also shown in FIG. 7. A terminal that has already engaged in SL communications with another terminal need not have a fixed or permanent SL configuration. One or more SL configuration parameters could change, and at least any changed parameters could be communicated to a terminal by network equipment or another terminal. Although reconfiguration is illustrated in FIG. 7 as occurring during or after SL communications at 706, reconfiguration could also or instead occur before any SL communications actually take place.

Apparatus embodiments are also contemplated. For example, an apparatus could include a processor and a non-transitory computer readable storage medium storing programming for execution by the processor. In an embodiment, the programming includes instructions to configure or cause the processor to obtain an SL configuration and communicate directly with a second communication terminal, with the SL configuration being separate from a communication network link configuration to be used by the communication terminal for communications with a network equipment in a communication network.

Other embodiments could include any of the following features, alone or in any of various combinations:

the SL configuration is or includes an SL BWP;
the SL BWP is or includes a BWP configured within a shared carrier spectrum in which communication resources for the communications with the network equipment in the communication network are configured;

the SL BWP is disjoint from the communication resources for the communications with the network equipment in the communication network;

the SL BWP at least partially overlaps the communication resources for the communications with the network equipment in the communication network;

the shared carrier spectrum is or includes an uplink carrier spectrum;

the SL BWP is or includes a BWP configured within a dedicated SL carrier spectrum;

the SL configuration is based on SL configuration information that is received to configure or reconfigure the SL configuration;

the programming includes instructions to obtain the SL configuration by obtaining an SL preconfiguration as the SL configuration;

the obtained SL preconfiguration includes any one of the following: an SL configuration preconfigured in the communication terminal prior to deployment of the communication terminal; an SL configuration preconfigured in the communication terminal other than by higher-layer signaling; an SL configuration preconfigured in the communication terminal by a network entity in the communication network prior to the communication terminal becoming out of coverage; an SL configuration forwarded to the communication terminal directly by another communication terminal; and a common or initial SL configuration preconfigured in the communication terminal;

the SL configuration further includes an SL communication resource configuration within the SL BWP;

the SL communication resource configuration includes one or more resource pools;

the one or more resource pools include one or more of: a transmit resource pool and a receive resource pool;

the SL configuration includes a common SL configuration to be used for SL communications by a plurality of communication terminals, including the communication terminal;

the SL BWP includes a common SL BWP to be used for SL communications by a plurality of communication terminals, including the communication terminal;

the SL configuration further includes an SL communication resource configuration of one or more resource pools within the common SL BWP;

the one or more resource pools include one or more of: a common resource pool to be used for SL communications by the plurality of communication terminals, and a terminal-specific resource pool to be used for SL communications by the communication terminal.

One or more of the features listed above could be implemented independently from other features. For example, in an embodiment, a communication terminal includes a processor and a non-transitory computer readable storage medium storing programming, for execution by the processor, including instructions to configure or cause the processor to: obtain a preconfigured SL configuration and communicate directly with a second communication terminal according to the preconfigured SL configuration.

As another example of independent implementation of features listed above, a communication terminal could include a processor and a non-transitory computer readable storage medium storing programming for execution by the processor, the programming including instructions to configure or cause the processor to: obtain an SL BWP configuration and communicate directly with a second communication terminal according to the SL BWP configuration, with the SL BWP configuration including an SL communication resource configuration within the SL BWP; and performing SL communications.

In another embodiment, a communication terminal includes a processor and a non-transitory computer readable storage medium storing programming, for execution by the processor, to configure or cause the processor to: obtain an SL configuration and communicate directly with a second communication terminal according to the SL configuration, with the SL configuration comprising a common SL configuration to be used for SL communications by a plurality of communication terminals, including the communication terminal.

It should be appreciated that one or more steps of the embodiment methods provided herein may be performed by corresponding units or modules. Embodiments are disclosed by way of example above, in the context of a terminal that includes processor and a non-transitory computer readable storage medium storing programming for execution by the processor. With reference to FIG. 2A, the processing unit 200 and the memory 208 are examples of such a processor and storage medium. Embodiments could also or instead be at least partially implemented in an air interface manager 201 (FIG. 2).

In other embodiments, any of various units or modules could be used in implementing features. For example, a signal may be transmitted by a transmitting unit or a transmitting module. A signal may be received by a receiving unit or a receiving module. A signal may be processed by a processing unit or a processing module. Other steps may be performed by an air interface management unit or module and/or a configuration unit or module. The respective units/modules may be implemented using hardware, components that execute software, or a combination thereof. For instance, one or more of the units/modules may be an integrated circuit, such as field programmable gate arrays (FPGAs) or application-specific integrated circuits (ASICs). It will be appreciated that where the modules are implemented using components that execute software, the software for such modules may be retrieved by a processor, in whole or part as needed, individually or together for processing, in single or multiple instances as required, and that software itself could include instructions for further deployment and instantiation.

The embodiments described above relate primarily to communication terminals and related methods. Embodiments could also or instead involve features that are provided at, or by, network equipment such as a gNB.

Figure 8A:
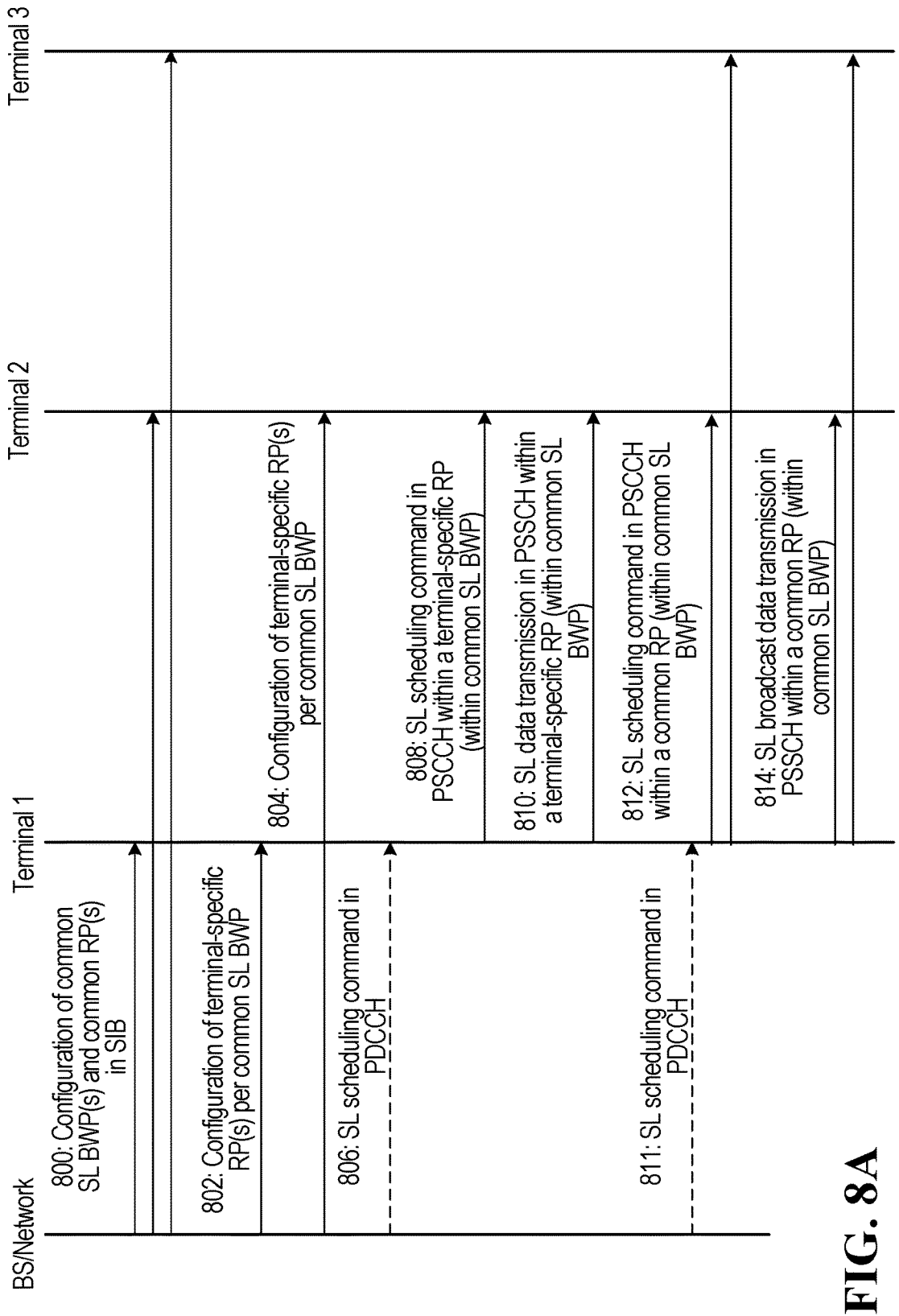
FIG. 8A is a signal flow diagram illustrating signaling between network equipment and terminals for configuring and using common and terminal-specific RP(s) within a common SL BWP.

FIG. 8A is a signal flow diagram illustrating signaling between network equipment and terminals for configuring and using common and terminal-specific RP(s) within a common SL BWP. FIG. 8A illustrates a BS as an example of network equipment, and three terminals, including Terminal 1, Terminal 2 and Terminal 3. The BS could be any network entity capable of resource configuration for SL communication, such as a gNB or a transmit and receive point, for example. In some embodiments disclosed herein, configuration information could even be relayed from one terminal to another.

Signaling for configuration of common SL BWP(s) and common RP(s) in SIB at 800, and/or signaling for configuration of terminal-specific RP(s) per common SL BWP at 802, 804 might not necessarily be performed in all embodiments. Any one or more of Terminal 1, Terminal 2, and Terminal 3 could be preconfigured or otherwise might not require configuration signaling every time Terminal 1 has data to transmit or every time Terminal 2 and/or Terminal 3 is to monitor for SL data transmissions. Examples of signaling for such configurations are provided elsewhere herein.

The signaling of an SL scheduling command in PDCCH at 806 is also optional and would not be performed in NR Mode 2, for example.

At 808, an SL scheduling command is sent from Terminal 1 to Terminal 2 in PSCCH within a terminal-specific RP of Terminal 1 within the common SL BWP. An SL data transmission is then sent at 810 from Terminal 1 to Terminal 2 in PSSCH within a terminal-specific RP within the common SL BWP. This is an example of SL communications between Terminal 1 and Terminal 2.

Groupcast or broadcast SL communications are also possible, and a broadcast example is also shown in FIG. 8A. An SL scheduling command could be signaled in PDCCH at 811 in some embodiments, but is optional and would not be performed in NR Mode 2, for example. At 812, an SL scheduling command is sent from Terminal 1 to Terminal 2 and to Terminal 3 in PSCCH within a common RP within the common SL BWP, and an SL broadcast data transmission is then sent at 814 from Terminal 1 and received by Terminal 2 and Terminal 3 in this example, in PSSCH within a common RP within the common SL BWP.

Figure 8B:
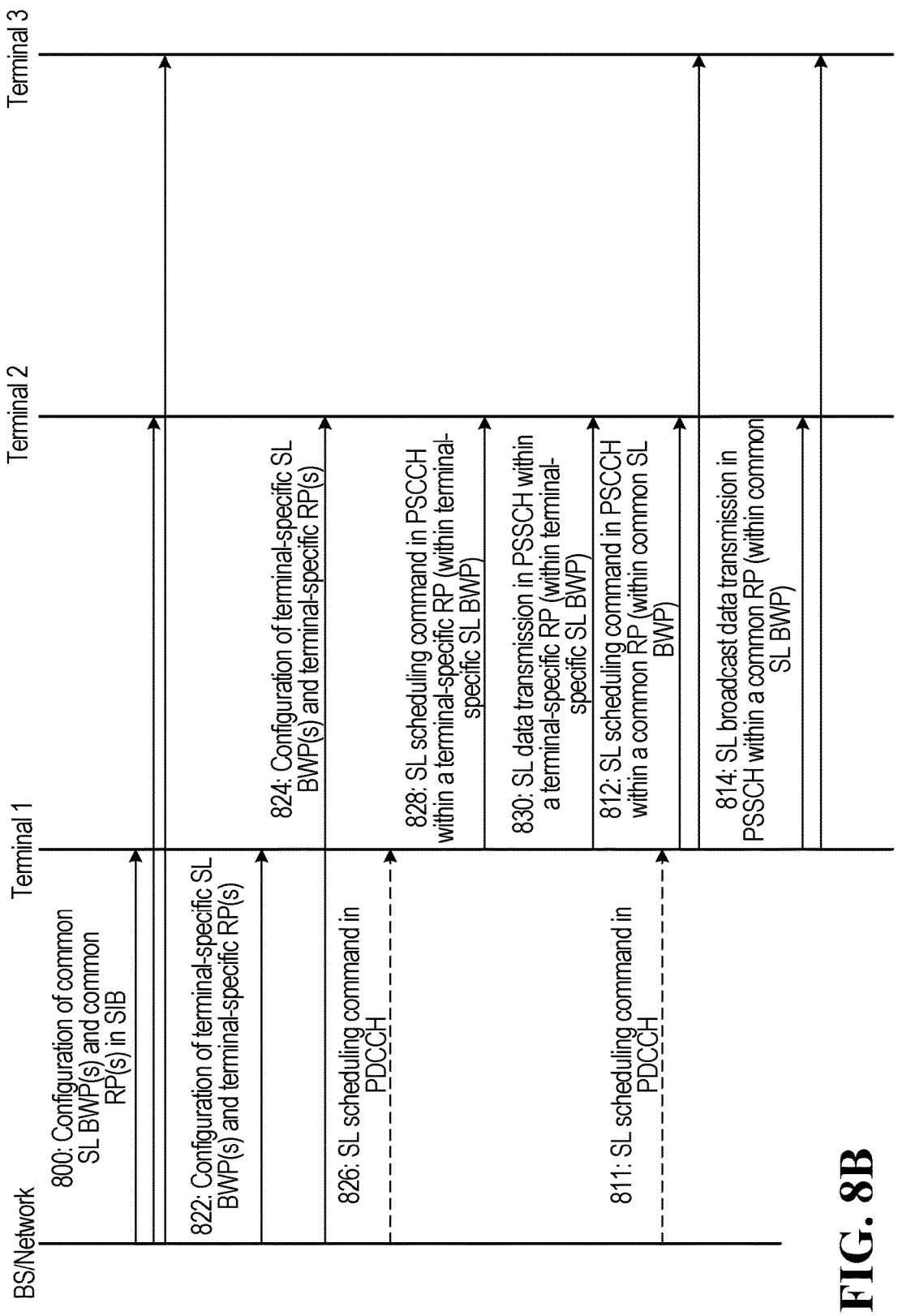
FIG. 8B is a signal flow diagram illustrating signaling between network equipment and terminals for configuring and using common RP(s) within a common SL BWP and terminal-specific RP(s) within a terminal-specific SL BWP.

FIG. 8B is a signal flow diagram illustrating signaling between network equipment and terminals for configuring and using common RP(s) within a common SL BWP and terminal-specific RP(s) within a terminal-specific SL BWP. Like FIG. 8A, FIG. 8B illustrates a BS as an example of network equipment, and three terminals, including Terminal 1, Terminal 2 and Terminal 3.

The signaling at 800 for configuration of common SL BWP(s) and common RP(s) in SIB, the signaling at 822 for configuration of terminal-specific SL BWP(s) and terminal-specific RP(s) for Terminal 1, and the signaling at 824 for configuration of terminal-specific SL BWP(s) and terminal-specific RP(s) for Terminal 2 might not necessarily be performed in all embodiments. Such signaling might not be performed if a terminal is preconfigured or otherwise do not require configuration signaling every time SL communications are to be performed. Although the configurations at 822, 824 are different from those at 802, 804 in FIG. 8A, examples of signaling that are provided elsewhere herein may also apply to these configurations in FIG. 8B.

As in FIG. 8A, the signaling of an SL scheduling command in PDCCH, at 826 in FIG. 8B, is optional. Terminal 1 could be operating in NR Mode 2, which does not require scheduling by network equipment.

At 828, an SL scheduling command is sent from Terminal 1 to Terminal 2 in PSCCH within a terminal-specific RP of Terminal 1, but in FIG. 8B the terminal-specific RP is within a terminal-specific SL BWP of Terminal 1 instead of in a common SL BWP as in FIG. 8A. An SL data transmission is then sent at 830 from Terminal 1 to Terminal 2 in PSSCH within a terminal-specific RP within the terminal-specific SL BWP of Terminal 1. This is an example of SL communications between Terminal 1 and Terminal 2 using terminal-specific RPs in a terminal-specific SL BWP.

Groupcast or broadcast SL communications in the example shown in FIG. 8B are the same as in FIG. 8A. At 811, an SL scheduling command could be signaled in PDCCH in some embodiments, but is optional and would not be performed in NR Mode 2, for example. At 812, an SL scheduling command is sent from Terminal 1 to Terminal 2 and to Terminal 3 in PSCCH within a common RP within the common SL BWP, and an SL broadcast data transmission is then sent at 814 from Terminal 1 and received by Terminal 2 and Terminal 3, in PSSCH within a common RP within the common SL BWP in this example.

FIGS. 8A and 8B illustrate how network equipment such as a BS could be involved in some embodiments. A network-side method performed at network equipment could include, for example, determining and transmitting to a communication terminal an SL configuration that is to be used by the communication terminal for SL communications directly between the communication terminal and another communication terminal. The SL configuration is separate from a communication network link configuration that is to be used by the communication terminal for communications with network equipment in some embodiments. An SL configuration, SL reconfiguration, or SL preconfiguration for use by the communication terminal after the terminal transitions from in coverage to out of coverage, could be transmitted through BS/terminal signaling as shown in FIGS. 8A and 8B, and detailed examples of such signaling are also provided elsewhere herein.

An SL configuration could be or include an SL BWP configuration and an SL communication resource configuration within the SL BWP, such as one or more resource pools as in the examples shown in FIGS. 8A and 8B.

An SL configuration that is determined and transmitted by network equipment to one or more terminals could also or instead involve a common or initial SL configuration to be used for SL communications by multiple communication terminals.

Network equipment could include, for example a processor and a non-transitory computer readable storage medium storing programming for execution by the processor. The programming includes instructions to perform a network-side method as disclosed herein.

Embodiments disclosed herein encompass at least the following examples.

According to an example, 1, a method involves obtaining, by a communication terminal, an SL configuration; and communicating directly, by the communication terminal, with a second communication terminal according to the SL configuration. The SL configuration is separate from a communication network link configuration to be used by the communication terminal for communications with a network equipment in a communication network.

An example 2 relates to the method of example 1, wherein the SL configuration comprises an SL BWP.

An example 3 relates to the method of example 2, wherein the SL BWP comprises a BWP configured within a shared carrier spectrum in which communication resources for the communications with the network equipment in the communication network are configured.

An example 4 relates to the method of example 3, wherein the SL BWP is disjoint from the communication resources for the communications with the network equipment in the communication network.

An example 5 relates to the method of example 3, wherein the SL BWP at least partially overlaps the communication resources for the communications with the network equipment in the communication network.

An example 6 relates to the method of any one of examples 3 to 5, wherein the shared carrier spectrum comprises an uplink carrier spectrum.

An example 7 relates to the method of example 2, wherein the SL BWP comprises a BWP configured within a dedicated SL carrier spectrum.

An example 8 relates to the method of any one of examples 1 to 7, wherein the SL configuration is based on SL configuration information that is received by the communication terminal to configure or reconfigure the SL configuration.

An example 9 relates to the method of any one of examples 1 to 7, wherein the obtaining step comprises: obtaining, by the communication terminal, an SL preconfiguration as the SL configuration.

An example 10 relates to the method of example 9, wherein the obtained SL preconfiguration comprises any one of the following: an SL configuration preconfigured in the communication terminal prior to deployment of the communication terminal; an SL configuration preconfigured in the communication terminal other than by higher-layer signaling; an SL configuration preconfigured in the communication terminal by a network entity in the communication network prior to the communication terminal becoming out of coverage; an SL configuration forwarded to the communication terminal directly by another communication terminal; a common or initial SL configuration preconfigured in the communication terminal.

An example 11 relates to the method of example 2, wherein the SL configuration further comprises an SL communication resource configuration within the SL BWP.

An example 12 relates to the method of example 11, wherein the SL communication resource configuration comprises one or more resource pools.

An example 13 relates to the method of example 12, wherein the one or more resource pools comprise one or more of: a transmit resource pool and a receive resource pool.

An example 14 relates to the method of example 1 or example 2, wherein the SL configuration comprises a common SL configuration to be used for SL communications by a plurality of communication terminals, including the communication terminal.

An example 15 relates to the method of example 2, wherein the SL BWP comprises a common SL BWP to be used for SL communications by a plurality of communication terminals, including the communication terminal, wherein the SL configuration further comprises an SL communication resource configuration of one or more resource pools within the common SL BWP.

An example 16 relates to the method of example 15, wherein the one or more resource pools comprise one or more of: a common resource pool to be used for SL communications by the plurality of communication terminals, and a terminal-specific resource pool to be used for SL communications by the communication terminal.

According to an example 17, a method comprises: obtaining, by a communication terminal, a preconfigured SL configuration; and communicating directly, by the communication terminal with a second communication terminal according to the preconfigured SL configuration.

An example 18 relates to the method of example 17, wherein the preconfigured SL configuration comprises any one of the following: an SL configuration preconfigured in the communication terminal prior to deployment of the communication terminal; an SL configuration preconfigured in the communication terminal other than by higher-layer signaling; an SL configuration preconfigured in the communication terminal by a network entity in the communication network prior to the communication terminal becoming out of coverage; an SL configuration forwarded to the communication terminal directly by another communication terminal; a common or initial SL configuration preconfigured in the communication terminal.

A method according to an example 19 comprises: obtaining, by a communication terminal, an SL BWP configuration; and communicating directly, by the communication terminal, with a second communication terminal according to the SL BWP configuration. The SL BWP configuration comprises an SL communication resource configuration within the SL BWP.

An example 20 relates to the method of example 19, wherein the SL communication resource configuration comprises one or more resource pools.

An example 21 relates to the method of example 20, wherein the one or more resource pools comprise one or more of: a transmit resource pool and a receive resource pool.

Another method, in accordance with an example 22, comprises: obtaining, by a communication terminal, an SL configuration; and communicating directly, by the communication terminal, with a second communication terminal according to the SL configuration. The SL configuration comprises a common SL configuration to be used for SL communications by a plurality of communication terminals, including the communication terminal.

An example 23 relates to the method of example 22, wherein the common SL configuration comprises a common SL BWP to be used for SL communications by the plurality of communication terminals, wherein the SL configuration further comprises an SL communication resource configuration of one or more resource pools within the common SL BWP.

An example 24 relates to the method of example 23, wherein the one or more resource pools comprise one or more of: a common resource pool to be used for SL communications by the plurality of communication terminals, and a terminal-specific resource pool to be used for SL communications by the communication terminal.

According to an example 25, a communication terminal comprises: a processor; and a non-transitory computer readable storage medium storing programming for execution by the processor, the programming including instructions to: obtain an SL configuration; and communicate directly with a second communication terminal according to the SL configuration. The SL configuration is separate from a communication network link configuration to be used by the communication terminal for communications with a network equipment in a communication network.

An example 26 relates to the communication terminal of example 25, wherein the SL configuration comprises an SL BWP.

An example 27 relates to the communication terminal of example 26, wherein the SL BWP comprises a BWP configured within a shared carrier spectrum in which communication resources for the communications with the network equipment in the communication network are configured.

An example 28 relates to the communication terminal of example 27, wherein the SL BWP is disjoint from the communication resources for the communications with the network equipment in the communication network.

An example 29 relates to the communication terminal of example 27, wherein the SL BWP at least partially overlaps the communication resources for the communications with the network equipment in the communication network.

An example 30 relates to the communication terminal of any one of examples 27 to 29, wherein the shared carrier spectrum comprises an uplink carrier spectrum.

An example 31 relates to the communication terminal of example 26, wherein the SL BWP comprises a BWP configured within a dedicated SL carrier spectrum.

An example 32 relates to the communication terminal of any one of examples 25 to 31, wherein the SL configuration is based on SL configuration information that is received to configure or reconfigure the SL configuration.

An example 33 relates to the communication terminal of any one of examples 25 to 32, wherein the programming includes instructions to obtain the SL configuration by obtaining an SL preconfiguration as the SL configuration.

An example 34 relates to the communication terminal of example 33, wherein the obtained SL preconfiguration comprises any one of the following: an SL configuration preconfigured in the communication terminal prior to deployment of the communication terminal; an SL configuration preconfigured in the communication terminal other than by higher-layer signaling; an SL configuration preconfigured in the communication terminal by a network entity in the communication network prior to the communication terminal becoming out of coverage; an SL configuration forwarded to the communication terminal directly by another communication terminal; a common or initial SL configuration preconfigured in the communication terminal.

An example 35 relates to the communication terminal of example 26, wherein the SL configuration further comprises an SL communication resource configuration within the SL BWP.

An example 36 relates to the communication terminal of example 35, wherein the SL communication resource configuration comprises one or more resource pools.

An example 37 relates to the communication terminal of example 36, wherein the one or more resource pools comprise one or more of: a transmit resource pool and a receive resource pool.

An example 38 relates to the communication terminal of example 25 or example 26, wherein the SL configuration comprises a common SL configuration to be used for SL communications by a plurality of communication terminals, including the communication terminal.

An example 39 relates to the communication terminal of example 26, wherein the SL BWP comprises a common SL BWP to be used for SL communications by a plurality of communication terminals, including the communication terminal, wherein the SL configuration further comprises an SL communication resource configuration of one or more resource pools within the common SL BWP.

An example 40 relates to the communication terminal of example 39, wherein the one or more resource pools comprise one or more of: a common resource pool to be used for SL communications by the plurality of communication terminals, and a terminal-specific resource pool to be used for SL communications by the communication terminal.

A communication terminal according to an example 41 comprises: a processor; and a non-transitory computer readable storage medium storing programming for execution by the processor, the programming including instructions to: obtain a preconfigured SL configuration; and communicate directly with a second communication terminal according to the preconfigured SL configuration.

An example 42 relates to the communication terminal of example 41, wherein the preconfigured SL configuration comprises any one of the following: an SL configuration preconfigured in the communication terminal prior to deployment of the communication terminal; an SL configuration preconfigured in the communication terminal other than by higher-layer signaling; an SL configuration preconfigured in the communication terminal by a network entity in the communication network prior to the communication terminal becoming out of coverage; an SL configuration forwarded to the communication terminal directly by another communication terminal; a common or initial SL configuration preconfigured in the communication terminal.

According to a further example 43, a communication terminal comprises: a processor; and a non-transitory computer readable storage medium storing programming for execution by the processor, the programming including instructions to: obtain a, SL BWP configuration; and communicate directly with a second communication terminal according to the SL BWP configuration. The SL BWP configuration comprises an SL communication resource configuration within the SL BWP.

An example 44 relates to the communication terminal of example 43, wherein the SL communication resource configuration comprises one or more resource pools.

An example 45 relates to the communication terminal of example 44, wherein the one or more resource pools comprise one or more of: a transmit resource pool and a receive resource pool.

A communication terminal according to an example 46 comprises: a processor; and a non-transitory computer readable storage medium storing programming for execution by the processor, the programming including instructions to: obtain an SL configuration; and communicate directly with a second communication terminal according to the SL configuration. The SL configuration comprises a common SL configuration to be used for SL communications by a plurality of communication terminals, including the communication terminal.

An example 47 relates to the communication terminal of example 46, wherein the common SL configuration comprises a common SL BWP to be used for SL communications by the plurality of communication terminals, wherein the SL configuration further comprises an SL communication resource configuration of one or more resource pools within the common SL BWP.

An example 48 relates to the communication terminal of example 47, wherein the one or more resource pools comprise one or more of: a common resource pool to be used for SL communications by the plurality of communication terminals, and a terminal-specific resource pool to be used for SL communications by the communication terminal.

An apparatus according to a further example 49 comprises: a processor; and a non-transitory computer readable storage medium storing programming for execution by the processor, the programming including instructions to perform a method according to any one of examples 1 to 24.

A computer program product according to an example 50 comprises a non-transitory computer readable storage medium storing programming, the programming including instructions to perform a method according to any one of examples 1 to 24.

Although aspects and examples of the present invention have been described with reference to specific features and illustrative embodiments thereof, this description is not intended to be construed in a limiting sense. The specific embodiments discussed are merely illustrative of specific ways to make and use aspects of the invention, and do not limit the scope of the invention. Various modifications and combinations of the illustrative embodiments, as well as other embodiments, will be apparent to persons skilled in the art upon reference to the description. It is therefore intended that the appended claims encompass any such modifications or embodiments. The description and drawings are, accordingly, to be regarded simply as an illustration of some embodiments of the invention as defined by the appended claims, and are contemplated to cover any and all modifications, variations, combinations or equivalents that fall within the scope of the present invention.

Therefore, although aspects of the present invention and possible advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described. As one of ordinary skill in the art will readily appreciate from the present disclosure, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and nonremovable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

It should also be appreciated that features disclosed herein could be applied to components other than those specifically referenced by way of example, such as V2X infrastructure components including roadside units (RSUs). An RSU is a stationary transportation infrastructure entity (e.g., an entity which can transmit speed notifications) supporting V2X applications that can exchange messages with other entities supporting V2X applications. An RSU is a logical entity which in addition to supporting V2X applications can also provide the functionalities of a network entity (e.g., eNB, gNB, base station), in which case it may be referred to as an e/gNB-type RSU, or a terminal, in which case it may be referred to as a terminal-type RSU. Network features therefore may apply to e/gNB-type RSUs and terminal features may apply to terminal-type RSUs.

Accordingly, a further embodiment could be in the form of an apparatus comprising: a processor; and a non-transitory computer readable storage medium storing programming for execution by the processor, the programming including instructions to perform a method according to any embodiment disclosed herein.

Similarly, a computer program product could include a non-transitory computer readable storage medium storing programming, the programming including instructions to perform a method according to any embodiment disclosed herein.

What is claimed is:

1. A method comprising:
obtaining, by a communication terminal, a sidelink (SL) bandwidth part (BWP) configuration, the SL BWP configuration indicating a frequency range of an SL BWP; and
communicating directly, by the communication terminal, with a second communication terminal according to the SL BWP configuration,
wherein the SL BWP configuration is separate from an uplink (UL) or downlink (DL) BWP configuration to be used by the communication terminal for communications with a network equipment in a communication network,
wherein the frequency range of the SL BWP is different from a frequency range of a UL or DL BWP indicated by the UL or DL BWP configuration, and
wherein the SL BWP configuration comprises a common SL BWP configuration to be used for SL communications by a plurality of communication terminals, the plurality of communication terminals including the communication terminal.

2. The method of claim 1, wherein the SL BWP comprises a BWP configured within a shared carrier spectrum in which communication resources for the communications with the network equipment in the communication network are configured.

3. The method of claim 2,
wherein the SL BWP is disjoint from the communication resources for the communications with the network equipment in the communication network; or
wherein the SL BWP at least partially overlaps the communication resources for the communications with the network equipment in the communication network.

4. The method of claim 1, wherein the SL BWP configuration is based on SL BWP configuration information that is received by the communication terminal to configure or reconfigure the SL BWP configuration.

5. The method of claim 1, wherein the obtaining comprises:
obtaining, by the communication terminal, an SL preconfiguration as the SL BWP configuration.

6. The method of claim 5, wherein the SL preconfiguration comprises one of:
an SL configuration preconfigured in the communication terminal prior to deployment of the communication terminal;
an SL configuration preconfigured in the communication terminal other than by higher-layer signaling;
an SL configuration preconfigured in the communication terminal by a network entity in the communication network prior to the communication terminal becoming out of coverage;
an SL configuration forwarded to the communication terminal directly by another communication terminal; or
a common or initial SL configuration preconfigured in the communication terminal.

7. The method of claim 1, wherein the SL BWP configuration further comprises an SL communication resource configuration within the SL BWP, and wherein the SL communication resource configuration comprises one or more resource pools.

8. A communication terminal comprising:
at least one processor; and
a non-transitory computer readable storage medium storing programming for execution by the at least one processor, the programming including instructions to:
obtain a sidelink (SL) bandwidth part (BWP) configuration, the SL BWP configuration indicating a frequency range of an SL BWP; and
communicate directly with a second communication terminal according to the SL BWP configuration,
wherein the SL BWP configuration is separate from an uplink (UL) or downlink (DL) BWP configuration to be used by the communication terminal for communications with a network equipment in a communication network,
wherein the frequency range of the SL BWP is different from a frequency range of a UL or DL BWP indicated by the UL or DL BWP configuration, and
wherein the SL BWP configuration comprises a common SL BWP configuration to be used for SL communications by a plurality of communication terminals, the plurality of communication terminals including the communication terminal.

9. The communication terminal of claim 8, wherein the SL BWP comprises a BWP configured within a shared carrier spectrum in which communication resources for the communications with the network equipment in the communication network are configured.

10. The communication terminal of claim 9,
wherein the SL BWP is disjoint from the communication resources for the communications with the network equipment in the communication network; or
wherein the SL BWP at least partially overlaps the communication resources for the communications with the network equipment in the communication network.

11. The communication terminal of claim 8, wherein the SL BWP configuration is based on SL BWP configuration information that is received to configure or reconfigure the SL BWP configuration.

12. The communication terminal of claim 8, wherein the programming includes instructions to obtain the SL BWP configuration by obtaining an SL preconfiguration as the SL BWP configuration.

13. The communication terminal of claim 12, wherein the SL preconfiguration comprises one of:
an SL configuration preconfigured in the communication terminal prior to deployment of the communication terminal;
an SL configuration preconfigured in the communication terminal other than by higher-layer signaling;
an SL configuration preconfigured in the communication terminal by a network entity in the communication network prior to the communication terminal becoming out of coverage;
an SL configuration forwarded to the communication terminal directly by another communication terminal; or
a common or initial SL configuration preconfigured in the communication terminal.

14. The communication terminal of claim 8, wherein the SL BWP configuration further comprises an SL communication resource configuration within the SL BWP, and wherein the SL communication resource configuration comprises one or more resource pools.

15. An apparatus comprising:
at least one processor; and
a non-transitory computer readable storage medium storing programming for execution by the at least one processor, the programming including instructions to perform operations, the operations comprising:
- obtaining a sidelink (SL) bandwidth part (BWP) configuration, the SL BWP configuration indicating a frequency range of an SL BWP; and
- communicating directly with a second apparatus according to the SL BWP configuration,
- wherein the SL BWP configuration is separate from an uplink (UL) or downlink (DL) BWP configuration to be used by the apparatus for communications with a network equipment in a communication network,
- wherein the frequency range of the SL BWP is different from a frequency range of a UL or DL BWP indicated by the UL or DL BWP configuration, and
- wherein the SL BWP configuration comprises a common SL BWP configuration to be used for SL communications by a plurality of communication terminals, the plurality of communication terminals including the communication terminal.

16. A computer program product comprising a non-transitory computer readable storage medium storing programming, the programming including instructions that, when executed by a communication terminal, cause the communication terminal to perform operations, the operations comprising:
- obtaining a sidelink (SL) bandwidth part (BWP) configuration, the SL BWP configuration indicating a frequency range of an SL BWP; and
- communicating directly with a second communication terminal according to the SL BWP configuration,
- wherein the SL BWP configuration is separate from an uplink (UL) or downlink (DL) BWP configuration to be used by the communication terminal for communications with a network equipment in a communication network,
- wherein the frequency range of the SL BWP is different from a frequency range of a UL or DL BWP indicated by the UL or DL BWP configuration, and
- wherein the SL BWP configuration comprises a common SL BWP configuration to be used for SL communications by a plurality of communication terminals, the plurality of communication terminals including the communication terminal.

* * * * *